(12) United States Patent
Hemmi et al.

(10) Patent No.: US 10,766,991 B2
(45) Date of Patent: Sep. 8, 2020

(54) SULFONATE GROUP-CONTAINING POLYMER AND METHOD OF PRODUCING THE SAME

(71) Applicant: NIPPON SHOKUBAI CO., LTD., Osaka-shi, Osaka (JP)

(72) Inventors: Akiko Hemmi, Osaka (JP); Hirotaka Mizoguchi, Osaka (JP); Rika Matsumoto, Osaka (JP); Xiaoli Wang, Beijing (CN); Xianling Zhai, Beijing (CN); Peng Qin, Beijing (CN); Xiaoyan Liu, Beijing (CN)

(73) Assignee: NIPPON SHOKUBAI CO., LTD., Osaka (JP)

( * ) Notice: Subject to any disclaimer, the term of this patent is extended or adjusted under 35 U.S.C. 154(b) by 13 days.

(21) Appl. No.: 15/329,135

(22) PCT Filed: Sep. 25, 2014

(86) PCT No.: PCT/CN2014/087389
§ 371 (c)(1),
(2) Date: Jan. 25, 2017

(87) PCT Pub. No.: WO2016/045031
PCT Pub. Date: Mar. 31, 2016

(65) Prior Publication Data
US 2017/0247487 A1 Aug. 31, 2017

(51) Int. Cl.
| | | |
|---|---|---|
| C08F 220/06 | (2006.01) | |
| C08F 216/14 | (2006.01) | |
| C08F 220/58 | (2006.01) | |
| C11D 3/00 | (2006.01) | |

(52) U.S. Cl.
CPC .......... *C08F 220/06* (2013.01); *C08F 216/14* (2013.01); *C08F 220/58* (2013.01); *C11D 3/0036* (2013.01); *C08F 2800/20* (2013.01)

(58) Field of Classification Search
CPC .................................................. C08F 220/06
See application file for complete search history.

(56) References Cited

U.S. PATENT DOCUMENTS

| | | | |
|---|---|---|---|
| 6,451,952 B2 | 9/2002 | Yamaguchi et al. | |
| 7,390,776 B2 | 6/2008 | Tsumori et al. | |
| 8,586,523 B2 | 11/2013 | Dupont et al. | |
| 8,877,962 B2 | 11/2014 | Nakano et al. | |
| 2002/0016430 A1 | 2/2002 | Yamaguchi et al. | |
| 2003/0158361 A1 | 8/2003 | Yoneda et al. | |
| 2005/0003993 A1 | 1/2005 | Tsumori et al. | |
| 2006/0004162 A1 | 1/2006 | Yoneda et al. | |
| 2007/0004885 A1 | 1/2007 | Yoneda et al. | |
| 2011/0172459 A1 | 7/2011 | Nakano et al. | |
| 2011/0183880 A1 | 7/2011 | Yoneda et al. | |
| 2011/0245132 A1 | 10/2011 | Dupont et al. | |
| 2011/0251115 A1 | 10/2011 | Dupont et al. | |
| 2014/0296565 A1 | 10/2014 | Nakano et al. | |

FOREIGN PATENT DOCUMENTS

| | | |
|---|---|---|
| CA | 2 734 878 | 3/2010 |
| CA | 2 817 174 | 5/2012 |
| CN | 102197127 | 9/2011 |
| EP | 0 798 320 | 10/1997 |
| JP | 2002-138115 | 5/2002 |
| JP | 2004-075977 | 3/2004 |
| JP | 2004-217891 | 8/2004 |
| JP | 2005-247591 | 9/2005 |
| JP | 2008-208375 | 9/2008 |
| JP | 2010-111792 | 5/2010 |
| JP | 2014-500903 | 1/2014 |
| WO | 2007/089001 | 8/2007 |
| WO | 2010/030024 | 3/2010 |
| WO | 2012/105239 | 8/2012 |
| WO | 2014/032264 | 3/2014 |
| WO | 2016/045031 | 3/2016 |

OTHER PUBLICATIONS

Machine translation of JP2010111792. (Year: 2010).*
International Search Report for Application No. PCT CN/2014/087376, dated Jun. 16, 2015, 5 pages.

* cited by examiner

*Primary Examiner* — Wenwen Cai
(74) *Attorney, Agent, or Firm* — Hamre, Schumann, Mueller & Larson, P.C.

(57) ABSTRACT

A sulfonate group-containing copolymer is provided which comprising a structural unit (a) derived from a sulfonate group-containing monomer (A); a structural unit (b) derived from a (poly)oxyalkylene monomer (B); a structural unit (c) derived from a carboxyl group-containing monomer (C). The sulfonate group-containing copolymer comprises from 20% to 90% by mass in an acid form equivalent of the structural unit (c) in 100% by mass of all the structural units constituting the sulfonate group-containing copolymer. The product (P×Mw×n) of the ratio by mass P of the structural unit (b) to the structural unit (a) multiplied by the weight average molecular weight Mw of the sulfonate group-containing copolymer multiplied by the value n is from 950,000 to 800,000,000.

6 Claims, No Drawings

SULFONATE GROUP-CONTAINING POLYMER AND METHOD OF PRODUCING THE SAME

TECHNICAL FIELD

The present invention relates to a sulfonate group-containing polymer and a method of producing the sulfonate group-containing polymer. Specifically, the present invention relates to a sulfonate group-containing polymer useful as materials of detergent additives and the like, and a method of producing the sulfonate group-containing polymer.

BACKGROUND ART

Detergents used for washing clothes have conventionally contained detergent builders (detergent aids) such as zeolite, carboxymethylcellulose, or polyethylene glycol for the purpose of improving the washing effects of detergents.

In recent years, detergent compositions have contained polymers as detergent builders in addition to the above various detergent builders.

For example, use of water-soluble copolymers prepared from an unsaturated monocarboxylic acid monomer and an unsaturated polyalkylene glycol monomer and/or a sulfonate group-containing monomer, as detergent builders or the like, is disclosed (refer to Patent Literatures 1 to 4).

In recent years, consumers have been aware of environmental issues, and the performance needed for detergent builders seems to be changing. Specifically, consumers have saved water by using remaining hot water in a bath for laundry, or have chosen detergents effective at a small amount (compacted detergent compositions) to reduce the amount of detergent components discharged in drainage water.

However, laundry using remaining hot water in a bath has a problem of more soil or hard components in the water. Further, a similar problem arises in an area where there is water with high hardness. For the above problem, agents having higher anti-redeposition properties than the conventional properties are required to further suppress redeposition of soil to fibers or the like during washing under high hardness condition.

CITATION LIST

Patent Literature

Patent Literature 1: JP 2010-111792 A
Patent Literature 2: JP 2004-75977 A
Patent Literature 3: JP 2002-138115 A
Patent Literature 4: JP 2004-217891 A

SUMMARY OF INVENTION

Technical Problem

As described above, various polymers are conventionally reported, but such polymers have room for improvement in anti-redeposition properties, particularly anti-redeposition properties against hydrophilic soil such as clay under a hard water condition. Further, detergent builders meeting the current consumer needs are required to be developed. In particular, there is still a need for polymeric detergent builders in Patent Literatures 1 with further improved anti-redeposition properties and higher water hardness tolerance.

The present invention aims to provide a polymer having further improved anti-redeposition properties, particularly anti-redeposition properties against hydrophilic soil under high hardness condition when the polymer is used for detergents; and a method of producing the polymer.

Solution to Problem

The present inventors made various investigations on polymers suitable for detergent additives. As a result, the present inventors found that a sulfonate group-containing polymer with a specific weight average molecular weight having a structural unit derived from a carboxyl group-containing monomer, a structural unit derived from a (poly)oxyalkylene monomer, a structural unit derived from a sulfonate group-containing monomer in specific proportions has significantly improved anti-redeposition properties, particularly anti-redeposition properties against hydrophilic soil under high hardness condition (higher water hardness tolerance). Thus, the above problems are admirably solved to achieve the present invention.

That is, a first aspect of the present invention is sulfonate group-containing copolymer, comprising:

a structural unit (a) derived from a sulfonate group-containing monomer (A);

a structural unit (b) derived from a (poly)oxyalkylene monomer (B) represented by the following formula (1):

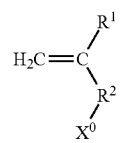
(1)

wherein $R^1$ represents a hydrogen atom or a methyl group; $R^2$ represents a direct bond, $CH_2$, or $CH_2CH_2$; and $X^0$ represents a structural unit represented by the following formula (2):

wherein Z may be the same or different and each represents a structural unit derived from a $C_2$-$C_{20}$ alkylene oxide; $R^0$ represents hydrogen atom or a $C_1$-$C_{30}$ organic group; and n is an integer of from 1 to 200; and a structural unit (c) derived from a carboxyl group-containing monomer (C), wherein the sulfonate group-containing copolymer comprises from 20% to 90% by mass in an acid form equivalent of the structural unit (c) in 100% by mass of all the structural units constituting the sulfonate group-containing copolymer, wherein the product (P×Mw×n) of the ratio by mass P of the structural unit (b) to the structural unit (a) multiplied by the weight average molecular weight Mw of the sulfonate group-containing copolymer multiplied by the value n in the formula (2) is from 950,000 to 800,000,000.

A second aspect of the present invention is a sulfonate group-containing copolymer, comprising: a structural unit (a) derived from a sulfonate group-containing monomer (A); a structural unit (b) derived from a (poly)oxyalkylene monomer (B) represented by the following formula (1):

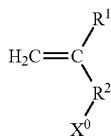
(1)

wherein $R^1$ represents a hydrogen atom or a methyl group; $R^2$ represents a direct bond, $CH_2$, or $CH_2CH_2$; and $X^0$ represents a structural unit represented by the following formula (2):

$$-Z_n-OR^0 \qquad (2)$$

wherein Z may be the same or different and each represents a structural unit derived from a $C_2$-$C_{20}$ alkylene oxide; $R^0$ represents hydrogen atom or a $C_1$-$C_{30}$ organic group; and n is an integer of from 1 to 200; and a structural unit (c) derived from a carboxyl group-containing monomer (C), wherein the sulfonate group-containing copolymer comprises from 20% to 90% by mass in acid form equivalent of the structural unit (c) in 100% by mass of all structural units constituting the sulfonate group-containing copolymer, wherein the ratio by mass P of the structural unit (b) to the structural unit (a) is from 1.2 to 20, wherein the sulfonate group-containing copolymer has a weight average molecular weight Mw of from 20,000 to 200,000, and wherein the product of the ratio by mass P of the structural unit (b) to the structural unit (a) multiplied by the weight average molecular weight Mw is 25,000 to 2,000,000.

Hereinafter, the present invention will be specifically described.

Preferred embodiments of the present invention include a combination of two or more of the preferred embodiments of the present invention described below.

The description of "sulfonate group-containing copolymer" herein shall apply to both the sulfonate group-containing copolymers of the first and the second aspects of the present invention, unless otherwise noted. When only the sulfonate group-containing copolymer of the first aspect of the present invention or only the sulfonate group-containing copolymer of the second aspect of the present invention is described, this shall be noted.

The copolymer of the present invention is a copolymer containing a structural unit (a) derived from a sulfonate group-containing monomer (A), a structural unit (b) derived from a (poly)oxyalkylene monomer (B), and a structural unit (c) derived from a carboxyl group-containing monomer (C).

[Sulfonate Group-Containing Monomer (Also Referred to as Sulfonate Group-Containing Unsaturated Monomer)]

The sulfonate group-containing monomer (A) of the present invention is a monomer having a sulfonate group and a carbon-carbon double bond. The sulfonate group is intended to include sulfonic acids and their salts. Examples of the salts of sulfonic acids include, but are not particularly limited to, metal salts, ammonium salts, and organic amine salts of sulfonic acids. The metal atom of the metal salts is preferably, for example, an alkali metal such as sodium or potassium; an alkaline earth metal such as magnesium, calcium, strontium, or barium; aluminum; or iron. Further, the organic amine group of the organic amine salt is preferably, for example, an alkanolamine such as monoethanolamine, diethanolamine, or triethanolamine; an alkylamine such as monoethylamine, diethylamine, or triethylamine; or a polyamine such as ethylenediamine or triethylenediamine. The salts of sulfonic acids are preferably potassium sulfonate, sodium sulfonate, ammonium sulfonate, or quaternary amines of sulfonic acids. The sulfonate group-containing monomer (A) may contain one or more sulfonate groups.

Examples of the sulfonate group-containing monomer (A) include 2-acrylamide-2-methylpropanesulfonic acid, styrene sulfonic acid, allyl sulfonic acid, vinyl sulfonic acid, their salts, and compounds represented by the following formula (3):

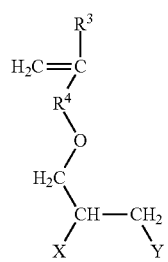
(3)

wherein $R^3$ represents a hydrogen atom or a methyl group; $R^4$ represents a direct bond, $CH_2$, or $CH_2CH_2$; X and Y each represent hydroxy or $SO_3M$ where M represents hydrogen atom, Li, Na, or K, and at least one of X and Y is $SO_3M$.

The sulfonate group-containing monomer (A) is preferably 2-acrylamide-2-methylpropanesulfonic acid or a compound represented by the formula (3), and more preferably a compound represented by the formula (3). The copolymer of the present invention having a structure derived from a compound represented by the formula (3) has improved anti-redeposition properties. $R^4$ in the formula (3) is more preferably $CH_2$ because it is likely to improve the anti-redeposition properties of the copolymer. It is preferable that one of X and Y in the formula (3) is a $SO_3M$ and the other is a hydroxy group. It is more preferable that X is a hydroxy group and Y is a $SO_3M$. Specific examples of the compound represented by the formula (3) include 3-(meth)allyloxy-2-hydroxypropanesulfonic acid (salts) and 3-(meth)allyloxy-1-hydroxypropanesulfonic acid (salts). The compound represented by the formula (3) is preferably 3-(meth)allyloxy-2-hydroxypropanesulfonic acid (salts). The sulfonate group-containing monomer (A) is preferably the compound represented by the formula (3) for increasing the preservation stability of the sulfonate group-containing copolymer.

The sulfonate group-containing copolymer contains preferably from 2% to 38% by mass in an acid form equivalent of the structural unit (a) in 100% by mass of all structural units constituting the sulfonate group-containing copolymer, more preferably from 2% to 30% by mass, still more preferably from 3% to 25% by mass, further more preferably from 4% to 20% by mass, particularly preferably from 5% to 18% by mass, and most preferably from 5% to 16% by mass.

Further, the sulfonate group-containing copolymer preferably contains not more than 1% by mass of the structural unit (a) derived from the sulfonate group-containing monomer (A) that has two or more sulfonate groups, in 100% by mass of all structural units constituting the sulfonate group-containing copolymer.

The "acid form equivalent" herein means that the proportion (compositional ratio) of the mass of each of the sulfonate group-containing monomer, the carboxyl group-containing monomer, and other acid group-containing monomers is calculated as the proportion of the acid form of the each monomer. The same shall apply to calculation of the proportion of the mass of the structural unit derived from the monomer relative to the mass of the structural units derived from all monomers contained in the copolymer. Specifically, calculation of the proportion of the mass of sodium acrylate relative to the mass of all monomer components means calculation of the mass of acrylic acid as an acid of sodium acrylate. Calculation of the proportion of the mass of a structural unit derived from sodium acrylate relative to the mass of the structural units derived from all monomer components means calculation of the mass of the structural unit derived from acrylic acid as an acid of sodium acrylate. For example, the proportions of the masses of an amine salt group-containing monomer and an amine salt structure-containing structural unit are also calculated as the proportions of the masses of an amine (amino group)-containing monomer and an amine structure (amino group structure)-containing structural unit, respectively.

The copolymer of the present invention preferably contains the structural unit (a) derived from the sulfonate group-containing monomer (A) represented by the formula (3) The structural unit (a) derived from the sulfonate group-containing monomer represented by the formula (3) herein is a copolymerized structural unit formed by radical polymerization of the sulfonate group-containing monomer represented by the formula (3), and is represented by the following formula (4):

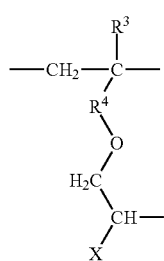

(4)

wherein $R^3$ represents a hydrogen atom or a methyl group; $R^4$ represents a direct bond, $CH_2$, or $CH_2CH_2$; X and Y each represent hydroxy or $SO_3M$ where M represents hydrogen atom, Li, Na, or K, and at least one of X and Y is $SO_3M$.

[(Poly)oxyalkylene Monomer]

The (poly)oxyalkylene monomer (B) of the present invention is characterized by having a structure represented by the formula (1).

In the structure represented by the formula (1), $R^1$ and $R^2$ are preferably respectively a hydrogen atom and $CH_2$, a methyl group and $CH_2$, or a methyl group and $CH_2CH_2$; more preferably respectively methyl and $CH_2$ or a methyl group and $CH_2CH_2$; and still more preferably respectively a methyl group and $CH_2CH_2$.

In the formula (2), Z represents a structural unit derived from a $C_2$-$C_{20}$ alkylene oxide, $R^0$ represents a hydrogen atom or a $C_1$-$C_{30}$ organic group, n is the number of alkylene oxide-derived structure repeating units, and is an integer of from 1 to 200.

Examples of the organic group in $R^0$ include $C_1$-$C_{30}$ alkyl, $C_2$-$C_{30}$ alkenyl, and $C_6$-$C_{30}$ aryl. These may further have a substituent group. Examples of the substituent group include hetero ring, alkoxy, aryloxy, alkylthio, arylthio, alkoxycarbonyl, aryloxycarbonyl, sulfamoyl, acyl, acyloxy, amide, carbamoyl, ureido, alkylsulfonyl, arylsulfonyl, amino, halogen, fluorohydrocarbon, cyano, nitro, hydroxy, mercapto, and silyl. Specific examples of the $C_1$-$C_{30}$ organic group include methyl, ethyl, butyl, octyl, lauryl, cyclohexyl, phenyl, naphthyl, pyridyl, pyrimidyl, imidazolidyl, morpholyl, butenyl, pentenyl, hexenyl, heptenyl, methylcarbonyl, and ethylcarbonyl.

$R^0$ is preferably a hydrogen atom or a methyl group, and more preferably a hydrogen atom.

In the formula (2), the "structural unit derived from an alkylene oxide" represents an oxyalkylene structure containing a ring-opening alkylene oxide. For example, in cases where an alkylene oxide is ethylene oxide (EO), the "structural unit derived from an alkylene oxide" is —$OCH_2CH_2$— (oxyethylene) that is an oxyalkylene structure containing a ring-opening ethylene oxide. The oxyalkylene as the structural unit derived from an alkylene oxide has 2 to 20 carbon atoms, preferably 2 to 15 carbon atoms, more preferably 2 to 10 carbon atoms, still more preferably 2 to 5 carbon atoms, particularly preferably 2 to 3 carbon atoms, and most preferably 2 carbon atoms.

Examples of the structural unit derived from an alkylene oxide include structures derived from compounds such as ethylene oxide (EO), propylene oxide (PO), isobutylene oxide, 1-butene oxide, 2-butene oxide, trimethylethylene oxide, tetramethylene oxide, tetramethylethylene oxide, butadiene monoxide, octylene oxide, styrene oxide, and 1,1-diphenyl ethylene oxide. In particular, the structural unit derived from an alkylene oxide (oxyalkylene) is preferably a group derived from EO or PO (that is, oxyethylene or oxypropylene), and more preferably oxyethylene. Only one species of oxyalkylene may be contained, or two or more species of oxyalkylenes may be contained.

A (poly)oxyalkylene glycol chain (group formed by oxyalkylene) contained in the (poly)oxyalkylene monomer of the present invention preferably mainly includes oxyethylene (—O—$CH_2$—$CH_2$—). In this case, the phrase "mainly includes oxyethylene" means that if two or more species of oxyalkylenes are present in the monomer, oxyethylene accounts for most of all oxyalkylenes. This allows smooth progress of polymerization in a production process, and provides excellent effects such as improvement in water solubility or anti-redeposition properties.

In the (poly)oxyalkylene glycol chain contained in the (poly)oxyalkylene monomer of the present invention "mainly including oxyethylene", the proportion of oxyethylene is preferably 50 to 100 mol % relative to 100 mol % of all oxyalkylenes. If the proportion of the oxyethylene is not less than 50 mol %, the hydrophilicity of the group formed by the oxyalkylene can be further improved. The proportion of the oxyethylene is more preferably not less than 60 mol %, still more preferably not less than 70 mol %, particularly preferably not less than 80 mol %, and most preferably not less than 90 mol %.

In the formula (2), n is the number of alkylene oxide-derived structure repeating units, and is an integer of from 1 to 200, preferably 5 to 100, more preferably 10 to 80, and still more preferably 25 to 75, and most preferably 40 to 60. When n is in the above preferred ranges, the compatibility with liquid detergents and the anti-redeposition properties of the resulting sulfonate group-containing copolymer tend to be improved.

The sulfonate group-containing copolymer of the present invention preferably contains from 9% to 76% by mass of the structural unit (b) in 100% by mass of all structural units constituting the sulfonate group-containing copolymer, more preferably from 10% to 70% by mass, still more preferably from 12% to 65% by mass, further more preferably from 15% to 60% by mass, particularly preferably from 18% to 50% by mass, yet more preferably from 20% to 49% by mass, and most preferably from 30% to 45% by mass. In the calculation of the total weight of all structural units derived from all monomers in the present invention, the weights of the sulfonate group-containing monomer, the carboxyl group-containing monomer, and other acid group-containing monomers contained in all monomer components are calculated as the weights of their acids monomers.

The copolymer of the present invention is characterized by having the structural unit (b) derived from the (poly) oxyalkylene monomer (B) represented by the formula (1) The structural unit (b) derived from the (poly)oxyalkylene monomer herein is a copolymerized structural unit formed by radical polymerization of the (poly)oxyalkylene monomer (B), and is represented by the following formula (5):

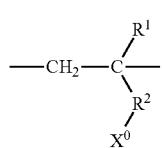

(5)

wherein $R^1$ represents a hydrogen atom or a methyl group; $R^2$ represents a direct bond, $CH_2$, or $CH_2CH_2$; and $X^0$ represents a structural unit represented by the formula (2).

<Method of Producing (poly)oxyalkylene Monomer>

The (poly)oxyalkylene monomer may be produced by any method. The (poly)oxyalkylene monomer (B) having a structure represented by the formula (1) is preferably produced by method (i) in which an alkylene oxide is added to an alcohol having a carbon-carbon double bond, such as allyl alcohol, methallyl alcohol, or isoprenol; or method (ii) in which a (poly)alkylene glycol is added to a halide having a carbon-carbon double bond, such as allyl chloride, methallyl chloride, isoprenyl chloride, or vinyl chloride.

In the method (i), an alkylene oxide is added to an alcohol having a carbon-carbon double bond by, for example, 1) anionic polymerization in which a hydroxide of an alkali metal, a strong alkali such as an alkoxide, or alkylamine is used as a base catalyst, 2) cationic polymerization in which a halide of a metal or metalloid, mineral acid, or acetic acid is used as a catalyst, or 3) coordination polymerization in which a combination of an alkoxide of a metal such as aluminum, iron, or zinc, an alkaline-earth compound, and/or Lewis acid is used. Thus, the alkylene oxide is added to the hydroxy group of the alcohol.

The (poly)oxyalkylene monomer (B) of the present invention having a structure represented by the formula (1) has good stability during polymerization. Accordingly, the anti-redeposition properties of the resulting polymer improve. Further, the (poly)oxyalkylene monomer (B) of the present invention having a structure represented by the formula (1) provides a polymer having favorable temporal stability. Further, when processed into various products (compositions) for various applications, the polymer (sulfonate group-containing copolymer) of the present invention shows excellent stability, and whereby the resulting product preferably has stable performance.

[Carboxyl Group-Containing Monomer (Also Referred to as Carboxyl Group-Containing Unsaturated Monomer)]

The carboxyl group-containing monomer (C) of the present invention is a monomer having carboxyl and a carbon-carbon double bond. The carboxyl is intended to include carboxylic acids and their salts. Examples of the salts of the carboxylic acids include, but are not particularly limited to, metal salts, ammonium salts, and organic amine salts of carboxylic acids. Preferred examples of a metal atom of the metal salts include alkali metals such as sodium and potassium; alkaline earth metals such as magnesium, calcium, strontium, and barium; aluminum; and iron. Further, preferred examples of an organic amine group of the organic amine salt include alkanolamines such as monoethanolamine, diethanolamine, and triethanolamine; alkylamines such as monoethylamine, diethylamine, and triethylamine; polyamines such as ethylenediamine and triethylenediamine. Examples of the salts of the carboxylic acids include lithium salts, potassium salts, sodium salts, ammonium salts, and quaternary amine salts.

Examples of the carboxyl group-containing monomer include (meth)acrylic acid, maleic acid, anhydride thereof, fumaric acid, itaconic acid, crotonic acid, 2-methylene glutaric acid, and their salts. In particular, in view of their high polymerizability and obtaining a copolymer having high anti-redeposition properties, the carboxyl group-containing monomer is more preferably (meth)acrylic acid, maleic acid, anhydride thereof, or their salts, still more preferably acrylic acid, maleic acid, anhydride thereof, or their salts, and particularly preferably acrylic acid or its salt. In cases where the carboxyl group-containing monomer is a compound forming an acid anhydride, such as maleic acid, the monomer may be in the acid anhydride form. These carboxyl group-containing monomers may be used alone, or two or more of these may be used in combination.

In light of the structure, the proportion of the mass of the carboxyl group-containing monomer that corresponds to the (poly)oxyalkylene monomer of the present invention is calculated as the mass of the (poly)oxyalkylene monomer. In cases where the carboxyl group-containing monomer is an acid anhydride, the mass of the monomer is calculated as the mass of the dicarboxylic acid, which is an acid of the monomer, prepared from the acid anhydride by hydrolysis.

The sulfonate group-containing copolymer of the present invention contains from 20% to 90% by mass in acid form equivalent of the structural unit (c) in 100% by mass of all structural units constituting the sulfonate group-containing copolymer. The amount of the structural unit (c) is preferably from 25% to 85% by mass, more preferably from 30% to 80% by mass, still more preferably 35% to 75% by mass, particularly preferably from 40% to 73% by mass, and most preferably from 40% to 55% by mass. The sulfonate group-containing polymer of the present invention having a proportion of the structural unit (c) of 20% to 90% by mass has improved anti-redeposition properties, particularly anti-redeposition properties against hydrophilic soil under high hardness condition. In order to improve the compatibility with liquid detergents as well as the anti-redeposition properties, the proportion of the structural unit (c) is most preferably 40% to 55% by mass. In light of the structure, the proportion of the mass of the carboxyl group-containing monomer that corresponds to a salt of an acid is calculated as the mass of acid. In cases where the carboxyl group-containing monomer is an acid anhydride, the mass of the monomer is calculated as the mass of the dicarboxylic acid, which is an acid of the monomer, prepared from the acid anhydride by hydrolysis.

The sulfonate group-containing copolymer of the present invention contains preferably from 1% to 100% by mass, more preferably from 20% to 100% by mass, still more preferably from 50% to 100% by mass, particularly preferably from 80% to 100% by mass, and most preferably 100% by mass, in acid form equivalent of a structural unit derived from a monocarboxylic acid such as (meth)acrylic acid in 100% by mass of the total of the structural unit (c) derived from the carboxyl group-containing monomer (C).

The copolymer of the present invention contains the structural unit (c) derived from the carboxyl group-containing monomer (C). The structural unit (c) is a copolymerized structural unit formed by radical polymerization of the carboxyl group-containing monomer (C). For example, in cases where the carboxyl group-containing monomer is acrylic acid, the structural unit (c) is the structure represented by —$CH_2$—CH(COOH)—.

[Other Monomers]

The sulfonate group-containing copolymer of the present invention may contain a structural unit (e) derived from a monomer (E) other than the sulfonate group-containing monomer (A), the (poly)oxyalkylene monomer (B), and the carboxyl group-containing monomer (C). Examples of the monomer (E) include, but are not particularly limited to, hydroxy group-containing alkyl (meth)acrylates such as 2-hydroxyethyl (meth)acrylate, 2-hydroxypropyl (meth) acrylate, 3-hydroxypropyl (meth)acrylate, 2-hydroxybutyl (meth)acrylate, 4-hydroxybutyl (meth)acrylate, and α-(hydroxymethyl)ethyl (meth)acrylate; alkyl (meth)acrylates prepared by esterification of (meth)acrylic acid with a $C_1$-$C_{18}$ alcohol, such as methyl (meth)acrylate, ethyl (meth) acrylate, butyl (meth)acrylate, cyclohexyl (meth)acrylate, and lauryl (meth)acrylate; amino group-containing acrylates such as dimethylaminoethyl (meth)acrylate and quaternized dimethylaminoethyl (meth)acrylate; amide group-containing monomers such as (meth)acrylamide, dimethyl acrylamide, and isopropyl acrylamide; vinyl esters such as vinyl acetate; alkenes such as ethylene and propylene; aromatic vinyl monomers such as styrene; maleimide derivatives such as maleimide, phenyl maleimide, and cyclohexyl maleimide; nitrile group-containing vinyl monomers such as (meth) acrylonitrile;

phosphonic acid (salt) group-containing monomers such as vinylphosphonic acid, (meth)allylphosphonic acid, and their salts; aldehyde group-containing vinyl monomers such as (meth)acrolein; alkyl vinyl ethers such as methyl vinyl ether, ethyl vinyl ether, and butyl vinyl ether; other functional group-containing monomers such as vinyl chloride, vinylidene chloride, allyl alcohol, and vinyl pyrrolidone. These other monomers may be used alone, or two or more of these may be used in combination.

The copolymer of the present invention contains preferably from 0% to 30% by mass, more preferably from 0% to 20% by mass, still more preferably from 0% to 10% by mass, and most preferably 0% by mass of the structural unit (e) derived from the monomer (E) in 100% by mass of all structural units constituting the sulfonate group-containing copolymer.

The structural unit (e) derived from the monomer (E) herein is a copolymerized structural unit formed by radical polymerization of the monomer (E). For example, in cases where the monomer (E) is methyl acrylate, the structural unit (e) is a structural unit represented by —$CH_2$—CH (COO$CH_3$)—.

Two or more of the structural units (a), (b), (c), and (e) more preferably satisfy the above preferred proportions in the copolymer of the present invention. That is, the copolymer of the present invention containing a combination of the structural units (a), (b), (c) and (e) with the above preferred proportions is also a preferred embodiment of the copolymer of the present invention. The total of the proportions of the combination is 100% by mass.

[Sulfonate Group-Containing Copolymer]

The sulfonate group-containing copolymer of the first aspect of the present invention is characterized in that the product (P×Mw×n) of the ratio by mass P of the structural unit (b) to the structural unit (a) multiplied by the weight average molecular weight Mw of the sulfonate group-containing copolymer multiplied by the value n in the formula (2) is from 950,000 to 800,000,000. The value (P×Mw×n) is preferably not less than 1,000,000. The sulfonate group-containing copolymer of the present invention having such a product (P×Mw×n) further adsorbs hydrophilic soil, and improves particularly the anti-redeposition properties against hydrophilic soil under high hardness condition. The product (P×Mw×n) is more preferably not less than 1,500,000 and still more preferably not less than 2,000,000. The product (P×Mw×n) is preferably not larger than 500,000,000 and more preferably not larger than 100,000,000.

The sulfonate group-containing copolymer of the second aspect of the present invention has the structural unit (a) derived from the sulfonate group-containing monomer (A), the structural unit (b) derived from the (poly)oxyalkylene monomer (B), and the structural unit (c) derived from the carboxyl group-containing monomer (C). The ratio by mass P of the structural unit (b) to the structural unit (a) is from 1.2 to 20. The ratio by mass P of the structural unit (b) to the structural unit (a) is preferably from 1.3 to 20, more preferably from 1.5 to 15, still more preferably 2 to 10, and most preferably 2.5 to 5.

When the ratio by mass P is calculated, the masses of the structural unit (a) and the structural unit (b) are calculated as the masses of the acid-form structural unit of them.

The ratio by mass is determined as a ratio of the acid-form structural unit of the structural unit (b) to the acid-form structural unit of the structural unit (a).

The sulfonate group-containing polymer of the present invention having a ratio by mass P of the structural unit (b) to the structural unit (a) of from 1.2 to 20 has improved anti-redeposition properties, particularly anti-redeposition properties against hydrophilic soil under high hardness condition. Further, in order to improve the compatibility with liquid detergents as well as the anti-redeposition properties, the ratio by mass P of the structural unit (b) to the structural unit (a) is particularly preferably 3 to 10.

The sulfonate group-containing copolymer of the second aspect of the present invention has a weight average molecular weight Mw of from 20,000 to 200,000. The weight average molecular weight Mw is preferably from 22,000 to 150,000, more preferably from 25,000 to 100,000, and still more preferably from 30,000 to 80,000. The sulfonate group-containing polymer of the present invention having a weight average molecular weight Mw of from 20,000 to 200,000 has improved anti-redeposition properties, particularly anti-redeposition properties against hydrophilic soil under high hardness condition. Further, in order to improve the compatibility with liquid detergents as well as the anti-redeposition properties, the weight average molecular weight Mw is particularly preferably 20,000 to 80,000 and most preferably 30,000 to 75,000.

If the weight average molecular weight Mw is larger than 200,000, the copolymer may become highly viscous and its handling may be complicated. On the contrary, if the weight average molecular weight Mw is smaller than 20,000, the anti-redeposition properties deteriorate and the sufficient performance as detergent builders may not be exerted. The value of the weight average molecular weight Mw of the sulfonate group-containing copolymer of the present invention is determined by the method according to examples described below.

The sulfonate group-containing copolymer of the second aspect of the present invention enables to significantly improve the anti-redeposition properties, particularly anti-redeposition properties against hydrophilic soil under high hardness condition by the synergistic effects of combination of the ratio by mass P of the structural unit (b) to the structural unit (a), the weight average molecular weight Mw, and the product of the ratio by mass P of the structural unit (b) to the structural unit (a) multiplied by the weight average molecular weight Mw, in the above preferred ranges. Further, in terms of improvement in the compatibility with liquid detergents as well as the anti-redeposition properties, combination of the ratio by mass P of the structural unit (b) to the structural unit (a), the weight average molecular weight Mw, and the product of the ratio by mass P of the structural unit (b) to the structural unit (a) multiplied by the weight average molecular weight Mw, in the above preferred ranges, preferably provides synergistic effects.

Further, the number of alkylene oxide-derived structure repeating units in the formula (2) and the proportion of the structural unit (c) in the sulfonate group-containing copolymer contribute to the anti-redeposition properties and the compatibility with liquid detergents. Therefore, it is preferable to combine the preferable range of the number of the structure repeating units and the preferable range of the proportion. That is, combination of the above preferred ranges of the ratio by mass P of the structural unit (b) to the structural unit (a), the weight average molecular weight Mw, the product of the ratio by mass P of the structural unit (b) to the structural unit (a) multiplied by the weight average molecular weight Mw, the proportion of the structural unit (c) in the sulfonate group-containing copolymer, and the number of alkylene oxide-derived structure repeating units in the formula (2) is also a preferred embodiment of the present invention.

Also in the sulfonate group-containing copolymer of the first aspect of the present invention, the ratio by mass P of the structural unit (b) to the structural unit (a) is preferably from 1.2 to 20, more preferably from 1.3 to 20, still more preferably from 1.5 to 15, and particularly preferably from 2 to 10.

In addition, also in the sulfonate group-containing copolymer of the first aspect of the present invention, the weight average molecular weight Mw of the sulfonate group-containing copolymer is preferably from 20,000 to 200,000, more preferably from 22,000 to 150,000, still more preferably from 25,000 to 100,000, and particularly preferably from 30,000 to 80,000.

Also in the sulfonate group-containing copolymer of the first aspect of the present invention, when the ratio by mass P of the structural unit (b) to the structural unit (a) or the weight average molecular weight Mw is in the above preferred ranges, the anti-redeposition properties of the sulfonate group-containing polymer, particularly the anti-redeposition properties against hydrophilic soil under high hardness condition is improved. Further, when the weight average molecular weight Mw is in the above preferred ranges, the compatibility of the sulfonate group-containing polymer with liquid detergents is improved.

Further, when both the ratio by mass P of the structural unit (b) to the structural unit (a) and the weight average molecular weight Mw are in the above preferred ranges, also in the sulfonate group-containing copolymer of the first aspect of the present invention, the above-described synergistic effects of satisfying the both are exhibited.

That is, one preferred embodiment of the sulfonate group-containing copolymer of the first aspect of the present invention is that the sulfonate group-containing copolymer of the first aspect of the present invention corresponds to the sulfonate group-containing copolymer of the second aspect of the present invention.

In the sulfonate group-containing copolymer of the present invention, the product of the ratio by mass P of the structural unit (b) to the structural unit (a) multiplied by the weight average molecular weight Mw is 25,000 to 2,000,000, preferably 50,000 to 1,500,000, and more preferably 100,000 to 1,000,000. The sulfonate group-containing copolymer of the present invention having a product of the ratio by mass P of the structural unit (b) to the structural unit (a) multiplied by the weight average molecular weight Mw of 25,000 to 2,000,000 further adsorbs hydrophilic soil, and particularly improves anti-redeposition properties against hydrophilic soil under high hardness condition.

In order to improve the compatibility with liquid detergents as well as the anti-redeposition properties, the product of the ratio by mass P of the structural unit (b) to the structural unit (a) multiplied by the weight average molecular weight Mw is preferably 70,000 to 1,200,000, more preferably 100,000 to 1,000,000, still more preferably 120,000 to 1,000,000, and most preferably 130,000 to 1,200,000.

In the sulfonate group-containing copolymer of the present invention, the ratio by mass of the structural unit (a) to the structural unit (b) to the structural unit (c) is preferably (2 to 38)/(9 to 76)/(20 to 90), more preferably (2 to 30)/(10 to 70)/(25 to 85), still more preferably (3 to 25)/(12 to 65)/(30 to 80), further more preferably (4 to 20)/(15 to 60)/(35 to 75), particularly preferably (5 to 18)/(18 to 50)/(40 to 73), yet more preferably 5 to 16/20 to 49/43 to 70, and most preferably 5 to 16/30 to 45/40 to 55.

The total of the proportions of the structural units (a), (b), and (c) is 100% by mass.

The method of producing the sulfonate group-containing copolymer of the present invention is not particularly limited, is preferably the following [Method of producing sulfonate group-containing copolymer].

[Method of Producing Sulfonate Group-Containing Copolymer]

The present invention is also a method of producing the sulfonate group-containing copolymer. The method of producing the sulfonate group-containing copolymer of the present invention is not particularly limited, and a known polymerization method or a modified known method can preferably be used.

The production method preferably includes copolymerizing monomer components including a sulfonate group-containing monomer (A), a (poly)oxyalkylene monomer (B), and a carboxyl group-containing monomer (C), the monomer (B) being represented by the following formula (1):

wherein $R^1$ represents a hydrogen atom or a methyl group; $R^2$ represents a direct bond, $CH_2$, or $CH_2CH_2$; and $X^O$ represents a structural unit represented by the following formula (2):

$$—Z_n—OR^O \qquad (2)$$

wherein Z may be the same or different and each represents a structural unit derived from a $C_2$-$C_{20}$ alkylene oxide; $R^O$ represents a hydrogen atom or a $C_1$-$C_{30}$ organic group; and n is an integer of from 1 to 200, wherein the monomer components comprise from 20% to 90% by mass in acid form equivalent of the carboxyl group-containing monomer (C) in 100% by mass of all the monomers in the monomer components, and wherein the product (P×Mw×n) of the ratio by mass P of the structural unit (b) to the structural unit (a) multiplied by the weight average molecular weight Mw of the sulfonate group-containing copolymer multiplied by the value n in the formula (2) is from 950,000 to 800,000,000. Such a method of producing the sulfonate group-containing copolymer is also one aspect of the present invention.

The sulfonate group-containing monomer (A), the (poly)oxyalkylene monomer (B), and the carboxyl group-containing monomer (C) are preferably the same monomers as listed above.

In order to sufficiently exert the effects of the present invention, the proportion of the sulfonate group-containing monomer (A) is, but not particularly limited to, preferably from 2% to 34% by mass, more preferably from 2% to 30% by mass, still more preferably from 3% to 25% by mass, further more preferably from 4% to 20% by mass, particularly preferably from 5% to 18% by mass, and most preferably from 5% to 16% by mass in acid form equivalent in 100% by mass of all the monomers.

In order to sufficiently exert the effects of the present invention, the proportion of the (poly)oxyalkylene monomer (B) is, but not particularly limited to, preferably from 9% to 76% by mass, more preferably 10% to 70% by mass, still more preferably from 12% to 65% by mass, further preferably from 15% to 60% by mass, particularly preferably from 18% to 50% by mass, yet more preferably from 20% to 49% by mass, and most preferably from 30% to 45% by mass in acid form equivalent in 100% by mass of all the monomers.

In order to sufficiently exert the effects of the present invention, the proportion of the carboxyl group-containing monomer (C) is preferably from 20% to 90% by mass, more preferably from 25% to 85% by mass, still more preferably from 30% to 80% by mass, further more preferably from 35% to 75% by mass, particularly preferably from 40% to 73% by mass, yet more preferably from 43% to 70% by mass, and most preferably from 40% to 55% by mass in acid form equivalent in 100% by mass of all the monomers.

The monomer (E) other than the sulfonate group-containing monomer (A), the (poly)oxyalkylene monomer (B), and the carboxyl group-containing monomer (C) may be contained as the monomer component. Examples of the monomer (E) include, but are not particularly limited to, the same monomers as listed above. The proportion of the monomer (E) is preferably from 0% to 30% by mass, more preferably from 0% to 20% by mass, still more preferably from 0% to 10% by mass, and most preferably 0% by mass in 100% by mass of all the monomers.

The monomer components preferably contain two or more of the sulfonate group-containing monomer (A), the (poly)oxyalkylene monomer (B), the carboxyl group-containing monomer (C), and the monomer (E) in the above preferred proportions. That is, combination of the sulfonate group-containing monomer (A), the (poly)oxyalkylene monomer (B), the carboxyl group-containing monomer (C), and the monomer (E) in the above preferred proportions in all the monomers is also a preferred embodiment of the method of producing the sulfonate group-containing copolymer of the present invention.

In the copolymerization of the monomer components, the monomer components are preferably copolymerized using a polymerization initiator. Polymerization initiators known in the art may be used. Specifically, preferred examples thereof include hydrogen peroxide; persulfates such as sodium persulfate, potassium persulfate, and ammonium persulfate; azo compounds such as dimethyl-2,2'-azobis(2-methylpropionate), 2,2'-azobis(2-amidinopropane) hydrochloride, 4,4'-azobis-4-cyanovaleric acid, azobisisobutyronitrile, and 2,2'-azobis(4-methoxy-2,4-dimethylvaleronitrile); and organic peroxides such as benzoyl peroxide, lauroyl peroxide, peracetic acid, di-t-butyl peroxide, and cumene hydroperoxide. Among these polymerization initiators, hydrogen peroxide and persulfates are preferred, and persulfates are most preferred. Any of these polymerization initiators may be used alone, or a mixture of two or more of these may be used.

The amount of the polymerization initiator to be used in the polymerization reaction may be appropriately controlled depending on the amount of the monomer components to be used, and is not particularly limited. For example, the amount of the polymerization initiator is preferably not less than 0.001 parts by mass and not more than 20 parts by mass, more preferably not less than 0.005 parts by mass and not more than 15 parts by mass, and still more preferably not less than 0.01 parts by mass and not more than 10 parts by mass for 100 parts by mass of the monomers.

In the method of producing the sulfonate group-containing copolymer of the present invention, a chain transfer agent is preferably used in addition to the polymerization initiator. The chain transfer agent to be used is not particularly limited as long as it is a compound that allows for control of the molecular weight. Known chain transfer agents in the art may be used. Specific examples of the chain transfer agent thiol chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecyl mercaptan, octyl mercaptan, and butyl thioglycolate; halides such as carbon tetrachloride, methylene chloride, bromoform, and bromotrichloroethane; secondary alcohols such as isopropanol and glycerin; and lower oxides and their salts such as phosphorous acid, hypophosphorous acid, and their salts (sodium hypophosphate, potassium hypophosphate, etc.), sulfurous acid, hydrogen sulfurous acid, dithionous acid, metabisulfurous acid, and their salts (sodium hydrogen sulfite, potassium hydrogen sulfite, sodium dithionite, potassium dithionite, sodium metabisulfite, potassium metabisulfite, etc.). Any of these chain transfer agents may be used alone, or a mixture of two or more of these may be used.

The amount of the chain transfer agent used in the method of producing the sulfonate group-containing copolymer of the present invention is 0.5 to 10 g relative to 1 mol of all the monomers. The chain transfer agent in such a proportion allows easy production of the sulfonate group-containing copolymer with a preferred molecular weight. The amount of the chain transfer agent used is preferably 1.0 to 7.0 g for 1 mol of all the monomers and more preferably 2.0 to 5.0 g for 1 mol of all the monomers.

In the method of producing the sulfonate group-containing copolymer of the present invention, a reaction accelerator may be added for the purpose of reducing the amount of the initiator or the like to be used. Examples of the reaction accelerator include heavy metal ions. The term "heavy metal ions" herein is intended to include metals having a specific gravity of not less than 4 g/cm$^3$. Preferred examples of the heavy metal ions include ions of iron, cobalt, manganese, chromium, molybdenum, tungsten, copper, silver, gold, lead, platinum, iridium, osmium, palladium, rhodium, and ruthenium. Any of these heavy metal ions may be used alone, or two or more of these may be used in combination. Among these, iron is more preferred. The ionic valency of the heavy metal ion is not particularly limited. For example, when iron is used as a heavy metal, the initiator may include iron ion in the Fe$^{2+}$ form or Fe$^{3+}$ form, or may contain iron in both forms.

The state of the above heavy metal ion is not particularly limited as long as it is present in an ionic form. It is preferable to use a solution prepared by dissolving a heavy metal compound because of the easy handling. The heavy metal compound used in this case may be any compound containing a heavy metal ion desired to be contained in the initiator, and it may be determined depending on the initiator to be used. In cases where the heavy metal ion used is iron, preferred examples of the heavy metal compound to be used include Mohr's salt (Fe(NH$_4$)$_2$(SO$_4$)$_2$.6H$_2$O), ferric sulfate heptahydrate, ferrous chloride, and ferric chloride. Furthermore, in cases where the heavy metal ion used is manganese, preferred examples of the heavy metal compound include manganese chloride. These heavy metal compounds are all water-soluble compounds. Therefore, it is possible to use them in the form of aqueous solutions, and consequently, the handleability is excellent. The solvents of the solutions of the heavy metal compounds dissolved thereto are not limited to water, and any solvent may be used as long as it does not interfere with the polymerization reaction and can dissolve the heavy metal compound in the production of hydrophobic group-containing copolymer of the present invention.

Furthermore, the heavy metal ion content is preferably 0.1 to 10 ppm in the total mass of the polymerization reaction liquid at the time of the completion of the polymerization reaction. When the heavy metal ion content is not less than 0.1 ppm, the effect of the heavy metal ion is sufficiently exhibited. When the heavy metal ion content is not more than 10 ppm, the color of the polymer to be prepared can be further improved. Further, too much heavy metal ion content may cause soil of detergent builders when a product polymer is used as a detergent builder. The heavy metal ion content in the above range enables to sufficiently suppress such a problem.

The phrase "at the time of the completion of the polymerization reaction" means the time point when the polymerization reaction has been practically completed in the polymerization reaction solution, and the desired polymer has been prepared. For example, in cases where the polymer formed as a result of polymerization in the polymerization reaction solution is to be neutralized with an alkaline component, the amount of the heavy metal ion is calculated based on the total mass of the polymerization reaction solution after neutralization. When it contains two or more kinds of heavy metal ions, the total amount of the heavy metal ions may be set in the above range.

A combination of the initiator and the chain transfer agent to be used is most preferably a combination of one or more of persulfates and one or more of sulfites. In this case, the persulfate and the sulfite may be mixed in any ratio. Specifically, 0.3 to 8 parts by mass of the sulfite is preferably used for 1 part by mass of the persulfate. The lower limit of the amount of the sulfite is more preferably 0.5 parts by mass and most preferably 0.7 parts by mass for 1 part by mass of the persulfate. The upper limit of the amount of the sulfite is more preferably 7 parts by mass and most preferably 6 parts by mass for 1 part by mass of the persulfate. Not less than 0.3 parts by mass of the sulfite enables to reduce the total amount of the initiator used for reducing the molecular weight. Further, not more than 8 parts by mass of the sulfite enables to sufficiently suppress side reactions and sufficiently reduce impurities caused by the side reactions.

The combination of a chain-transfer agent, a polymerization initiator, and a reaction accelerator is not particularly limited, and these may be selected from those listed above. Examples of the combination of a chain-transfer agent, a polymerization initiator, and a reaction accelerator include sodium hydrogen sulfite (SBS)/hydrogen peroxide (H$_2$O$_2$), sodium hydrogen sulfite (SBS)/sodium persulfate (NaPS), sodium hydrogen sulfite (SBS)/Fe, sodium hydrogen sulfite (SBS)/hydrogen peroxide (H$_2$O$_2$)/Fe, sodium hydrogen sulfite (SBS)/sodium persulfate (NaPS)/Fe, sodium hydrogen sulfite (SBS)/sodium persulfate (NaPS)/hydrogen peroxide (H$_2$O$_2$), and sodium hydrogen sulfite (SBS)/oxygen/Fe. More preferred are sodium hydrogen sulfite (SBS)/sodium persulfate (NaPS) and sodium hydrogen sulfite (SBS)/sodium persulfate (NaPS)/Fe. Most preferred is sodium hydrogen sulfite (SBS)/sodium persulfate (NaPS)/Fe.

In the method of producing the sulfonate group-containing copolymer of the present invention, a catalyst for decomposing a polymerization initiator or a reducing compound may be added to the reaction system during polymerization in addition to the above described polymerization initiator. Examples of the catalyst for decomposing a polymerization initiator include halogenated metals such as lithium chloride and lithium bromide; metal oxides such as titanium oxide and silicon dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, benzoic acid, and their esters and metal salts; and heterocyclic amines and their derivatives such as pyridine, indole, imidazole, and carbazole. Any of these decomposition catalysts may be used alone, or two or more of these may be used in combination.

Examples of the reducing compound include organic metal compounds such as ferrocene; metal naphthenates such as iron naphthenate, copper naphthenate, nickel naphthenate, cobalt naphthenate, and manganese naphthenate; inorganic compounds capable of generating metal ions such as iron, copper, nickel, cobalt, and manganese; inorganic compounds such as boron trifluoride ether adducts, potassium permanganate, and perchloric acid; sulfur-containing compounds such as sulfur dioxide, sulfites, sulfates, bisulfites, thiosulfates, sulfoxylates, benzene sulfinic acid and their substituted compounds, and homologues of cyclic sulfinic acid such as p-toluene sulfinic acid; mercapto compounds such as octyl mercaptan, dodecyl mercaptan, mercapto ethanol, α-mercaptopropionic acid, thioglycolic acid, thiopropionic acid, sodium α-thiopropionate sulfopropylester, and sodium α-thiopropionate sulfoethylester; nitrogen-containing compounds such as hydrazine, β-hydroxyethylhydrazine, and hydroxylamine; aldehydes such as formaldehyde, acetaldehyde, propionaldehyde, n-butylaldehyde, isobutylaldehyde, and isovalerianaldehyde; and ascorbic acid. Any of these reducing compounds may also be used alone, or two or more of these may be used in combination.

The reducing compound such as mercapto compounds may be added as a chain transfer agent.

The total amount of a chain transfer agent, an initiator, and a reaction accelerator to be used is preferably 2 to 20 g for 1 mol of all monomer components of the sulfonate group-containing monomer, the (poly)oxyalkylene monomer, the carboxyl group-containing monomer, and, if necessary, other monomers. When the total amount is in the above range, the sulfonate group-containing copolymer of the present invention can be efficiently produced. Further, a desired molecular weight distribution of the sulfonate group-containing copolymer can be obtained. The total amount is more preferably 2 to 15 g and still more preferably 3 to 10 g.

The polymerization initiator and the chain transfer agent are continuously charged into a reactor by, for example, dropping or adding in portions. Furthermore, the chain-transfer agent may be charged into a reactor alone, or it may be mixed in advance with the monomers, solvents, or the like.

Examples of the method of charging the monomer components, the polymerization initiator, and the like into a reactor in the copolymerization method include: a method in which all monomer components are charged into a reactor, and a polymerization initiator is subsequently charged into the reactor to carry out copolymerization; a method in which a portion of the monomer components is charged into a reactor, and the remaining portion of the monomer components and a polymerization initiator are subsequently charged into the reactor continuously or in steps (preferably continuously) to carry out copolymerization; a method in which a polymerization solvent is charged into a reactor, and the monomer components and a polymerization initiator are all subsequently charged into the reactor; and a method in which a portion of one of the monomers (for example, (poly)oxyalkylene monomer) is charged into a reactor, and a polymerization initiator and the remaining monomers are (preferably continuously) added to the reactor to carry out copolymerization. In particular, copolymerization is preferably carried out by sequential dropping a polymerization initiator and monomer components to a reactor because it is possible to obtain a copolymer with a narrow (sharp) molecular weight distribution, and the dispersibility of the copolymer is improved when it is used as a detergent builder.

The copolymerization may be carried out by any method, and may be carried out by a commonly used method such as solution polymerization, bulk polymerization, suspension polymerization, or emulsion polymerization. Solution polymerization is preferred. As described above, the solvent used in this case is preferably water or a solvent mixture containing water in an amount of 50% by mass of the total amount of the solvent. Use of only water is suitable because the step of removing the solvent can be eliminated.

The copolymerization may be carried out in a batch or continuously. Furthermore, known solvents may be used as solvents used if necessary in the copolymerization. Preferred examples of the solvents include water; alcohols such as methyl alcohol, ethyl alcohol, and isopropyl alcohol; glycerin; polyethylene glycol; aromatic or aliphatic hydrocarbons such as benzene, toluene, xylene, cyclohexane, and n-heptane; esters such as ethyl acetate; ketones such as acetone and methyl ethyl ketone; amides such as dimethylformamide; and ethers such as diethyl ether and dioxane. Any of these solvents may be used alone, or two or more of these may be used in combination. In particular, one or more solvents selected from the group consisting of water and $C_1$-$C_4$ lower alcohols are preferably used in view of the solubility of the monomer components and the resulting copolymer.

In the method of producing the sulfonate group-containing copolymer of the present invention, an arbitrary chain transfer agent, pH regulator, or buffer may be used if needed.

The temperature in the polymerization is preferably not less than 70° C., more preferably 75° C. to 110° C., and still more preferably 80° C. to 100° C. At a temperature in the polymerization within the above range, the amount of the remaining monomer components tends to reduce, and the anti-redeposition properties of the polymer tend to improve. The temperature in the polymerization is not necessarily kept constant all the time while the polymerization reaction progresses. For example, the polymerization may be started from room temperature; the temperature may be raised to the setting temperature for a proper temperature rising time or at a proper temperature raising rate; and the setting temperature may be kept. Alternatively, the polymerization temperature may be changed (raised or reduced) according to the method of dropping the monomer components, the initiator, or the like with a lapse of time while the polymerization reaction progresses.

The polymerization time is not particularly limited, and preferably 30 to 420 min, more preferably 45 to 390 min, still more preferably 60 to 360 min, and most preferably 90 to 240 min. The term "polymerization time" herein means the time required to add the monomer.

The pressure in the reaction system may be any of normal pressure (atmospheric pressure), reduced pressure, and increased pressure. From the viewpoint of the molecular weight of the polymer to be obtained, the polymerization is preferably performed under normal pressure, or the reaction system is sealed and the polymerization is performed under increased pressure. The polymerization is preferably performed under normal pressure (atmospheric pressure) from the viewpoint of equipment such as pressuring and depressurizing apparatuses, a pressure-resistant reaction container, and pipes. The reaction system may be under air atmosphere, and may preferably be under inert atmosphere. For example, the air in the system is preferably replaced with an inert gas such as nitrogen before the polymerization is started.

The solid content concentration (that is, the concentration of polymer solids made of the monomers) in an aqueous solution at the end of the polymerization reaction in the polymerization reaction system is preferably not less than 35% by mass and more preferably 40% to 70% by mass. Such a high solid content concentration of not less than 35% by mass at the end of the polymerization reaction enables one-step polymerization at high concentration. In this case, for example, a condensation step which may be required in a conventional production method can be eliminated, so that the sulfonate group-containing copolymer composition can be efficiently obtained. Accordingly, as a result of significant improvement in production efficiency, the productivity of the sulfonate group-containing copolymer composition can be significantly improved and the production cost can be reduced.

After the completion of the polymerization reaction, a suitable alkali component may be appropriately added for post treatment, if needed, and the degree of neutralization (final degree of neutralization) of the resulting sulfonate group-containing copolymer may be set within a predetermined range.

The final degree of neutralization is not particularly limited. This is because the final degree of neutralization of the copolymer varies depending on intended use. Specifically, the copolymer does not need to be neutralized and may be in an acidic form when used as a detergent builder for weak acidic detergents, which are considered to be gentle to the skin, or the copolymer may be neutralized with an alkali component to a degree of neutralization of 90 mol % or higher in post treatment when used for neutral detergents or alkali detergents. Accordingly, the final degree of neutralization may be set to an extremely wide range of 1 to 100 mol %. In particular, the final degree of neutralization of the copolymer to be used as an acidic polymer composition is preferably 1 to 75 mol % and more preferably 5 to 70 mol %. The final degree of neutralization of the copolymer to be used as a neutral or alkaline polymer composition is preferably 70 to 99 mol % and more preferably 80 to 97 mol %. When the final degree of neutralization of the copolymer to be used as a neutral or alkaline polymer composition is 99 mol % or lower, coloring of the aqueous polymer solution can be suppressed.

Examples of the alkali component include alkali metal hydroxides such as sodium hydroxide and potassium hydroxide, alkaline earth metal hydroxides such as calcium hydroxide and magnesium hydroxide, and organic amines such as ammonium, monoethanolamine, diethanolamine, and triethanolamine. The alkali components may be used alone, or a mixture of two or more of these may be used.

[Sulfonate Group-Containing Copolymer Composition (Polymer Composition)]

The polymer composition of the present invention essentially contains the sulfonate group-containing copolymer of the present invention. In addition, the polymer composition may contain an unreacted sulfonate group-containing monomer, an unreacted (poly)oxyalkylene monomer, an unreacted carboxyl group-containing monomer, an unreacted polymerization initiator, a decomposed polymerization initiator, a binary copolymer of a sulfonate group-containing monomer and a carboxyl group-containing monomer, a hydrogen sulfite adduct, which is an impurity derived from the carboxyl group-containing monomer which remains unpolymerized although the above hydrogen sulfite and/or the compound capable of producing a hydrogen sulfite as a chain transfer agent is added thereto, and the like. Specific examples of the hydrogen sulfite adduct include 3-sulfopropionic acid (salts) and the like. The polymer composition of the present invention is prepared by polymerization of a sulfonate group-containing monomer that is a feature of the present invention, as an essential component, whereby generation of the homopolymer of the carboxyl group-containing monomer as a side product can be reduced. Therefore, the precipitation of the polymer can be significantly suppressed during washing under high hardness condition. Further, since generation of a homopolymer of the carboxyl group-containing monomer as a side product is suppressed, a liquid detergent containing the sulfonate group-containing copolymer composition has improved temporal stability (is suppressed from being phase-separated) as additional advantageous effects.

For the amount of the unreacted (poly)oxyalkylene monomer, the unreacted sulfonate group-containing unsaturated monomer and the 3-sulfopropionic acid (salts) in the polymer composition, each monomer is preferably contained in an amount of less than 5% by mass, more preferably less than 3% by mass and still more preferably less than 2% by mass based on 100% by mass of the solid content of the polymer composition. For the amount of the polymer including the acid group-containing unsaturated monomer in the polymer composition, the polymer is preferably contained in an amount of less than 1% by mass and more preferably less than 0.5% by mass based on 100% by mass of the solid content of the polymer composition. For the amount of the unreacted carboxyl group-containing monomer in the polymer composition, the monomer is preferably contained in an amount of not more than 5000 mass ppm, more preferably not more than 1000 mass ppm, and most preferably not more than 100 mass ppm based on 100% by mass of the solid content of the polymer composition. The unreacted (poly)oxyalkylene monomer, the unreacted sulfonate group-containing unsaturated monomer, the unreacted carboxyl group-containing monomer and 3-sulfopropionic acid (salts) can be quantified by liquid chromatography under the following conditions.

<Measurement Conditions of the Unreacted (poly)oxyalkylene Monomer>
Measuring device: 8020 series (product of Tosoh Co., Ltd.)
Detector: RI detector, RI-8020 (product of Tosoh Co., Ltd.)
Column: CAPCELL PAK C1 UG120 (product of Shiseido Co., Ltd.)
Temperature: 40.0° C.
Eluent: 10 mM di-Sodium hydrogen phosphate, 12-water (adjust pH to 7 by phosphoric acid)/acetonitrile=45/55 (volume ratio)
Flow velocity: 1.0 ml/min <Measurement Conditions of the Unreacted Sulfonate Group-Containing Unsaturated Monomer and the Unreacted Carboxyl Group-Containing Monomer>
Measuring device: L-7000 series (product of Hitachi Ltd.)
Detector: UV detector, L-7400 (product of Hitachi Ltd.)
Column: SHODEX RSpak DE-413 (product of Showa Denko K. K.)
Temperature: 40.0° C.
Eluent: 0.1% phosphoric acid aqueous solution
Flow velocity: 1.0 ml/min <Measurement Conditions of 3-Sulfopropionic Acid (Salts)>
Measuring device: e2695 (product of Waters Co., Ltd.)
Detector: RI detector, 2414 (product of Waters Co., Ltd.)
Column: TSKgel ODS-100V×2 (product of Tosoh Co., Ltd.)
Temperature: 30.0° C.
Eluent: 0.02M Potassium dihydrogenphosphate aqueous solution (pH 2.5)
Flow velocity: 0.7 ml/min The polymer composition herein is not particularly limited, and is preferably prepared through no purification step for eliminating impurities in view of the production efficiency. Further, the polymer composition herein includes those obtained by diluting the resulting polymer composition with a small amount of water (adding approximately from 1% to 400% by mass of water based on the amount of the mixture obtained) after the polymerization step for easy handling.

The polymer and the polymer composition of the present invention may be used as water treatment agents, fiber treatment agents, dispersants, or detergent builders (or detergent compositions). When used as detergent builders, the polymer and the polymer composition are added to various detergents used for, for example, clothing, dish washing, house cleaning, hair washing, body washing, tooth-brushing, and car-cleaning.

<Water Treatment Agent>

The polymer composition of the present invention may be used for a water treatment agent. Such a water treatment agent may contain other compounding agents such as polymerized phosphoric acid salts, phosphonic acid salts, anti-corrosion agents, slime control agents, and chelating agents, if needed.

The water treatment agent is useful for scale inhibition of cooling water circulation systems, boiler water circulation systems, seawater desalination plants, pulp digesters, black liquor condensing kettles, and the like. In addition, any suitable water-soluble polymer may be included as long as it does not affect the performance and the effects of the water treatment agent.

<Fiber Treating Agent>

The polymer composition of the present invention can be used for a fiber treating agent. The fiber treating agent contains the polymer composition of the present invention and at least one selected from the group consisting of dyeing agents, peroxides, and surfactants.

The fiber treating agent contains preferably from 1% to 100% by weight, and more preferably from 5% to 100% by weight of the polymer composition of the present invention based on the total amount of the fiber treating agent. In addition, any suitable water-soluble polymer may be contained as long as it does not affect the performance or the effects of the fiber treating agent.

An example of the composition of the fiber treating agent closer to the embodiment will be described below. The fiber treating agent can be used in steps of scouring, dyeing, bleaching, and soaping in fiber treatment. Examples of dyeing agents, peroxides, and surfactants include those usually used in the fiber treating agent.

For the proportions of the polymer composition of the present invention and at least one selected from the group consisting of coloring agents, peroxides, and surfactants, a composition containing 0.1 to 100 parts by weight of at least one selected from the group consisting of coloring agents, peroxides, and surfactants for 1 part by weight of the polymer composition of the present invention in terms of pure fiber treating agent is preferably used as the fiber treating agent, for example, for improving whiteness and coloring fastness of fiber and prevent uneven coloring.

The fiber treating agent is applicable to any optionally suitable fibers. Examples of the fibers include cellulose-based fibers such as cotton and hemp; synthetic fibers such as Nylon and polyester; animal fibers such as wool and silk; semi-synthetic fibers such as rayon; their fabrics; and their mixed spun products.

In cases where the fiber treating agent is used in the scouring step, the polymer composition of the present invention is preferably blended with an alkaline agent and a surfactant. In cases where the fiber treating agent is used in the bleaching step, the polymer composition of the present invention is preferably blended with a peroxide and a silicic acid-based chemical such as sodium silicate as an alkaline bleach decomposition inhibitor.

<Inorganic Pigment Dispersant>

The polymer composition of the present invention may be used as an inorganic pigment dispersant. The inorganic pigment dispersant may be compounded, if necessary, with other components such as condensed phosphoric acid or its salt, phosphonic acid or phosphonate, and poly(vinyl alcohol).

The inorganic pigment dispersant preferably contains the polymer composition of the present invention in an amount of 5% to 100% by weight based on the total amount of the inorganic pigment dispersant. The dispersant may contain an optionally suitable water-soluble polymer as long as the performance and the effects are not affected.

The inorganic pigment dispersant exhibits its excellent performance when used as a dispersant of inorganic pigments such as heavy or light calcium carbonate and clay used for paper coating. For example, a small amount of the inorganic pigment dispersant is added to an inorganic pigment to disperse the pigment in water, whereby high-concentration inorganic pigment slurry such as high concentration calcium carbonate slurry with low viscosity, high fluidity, and good stability with time for these properties can be produced.

The amount of the inorganic pigment dispersant used for dispersing the inorganic pigment is preferably 0.05 to 2.0 parts by weight for 100 parts by weight of the inorganic pigment. Use of the inorganic pigment dispersant in an amount within the above range achieves a satisfactory dispersing effect to provide effects appropriately for the added amount and also provides an economical advantage.

<Detergent Composition>

The polymer composition of the present invention may be added to a detergent composition.

The polymer composition of the present invention contains the above sulfonate group-containing copolymer, and the amount of the sulfonate group-containing copolymer contained in the detergent composition is not particularly limited. From the viewpoint of demonstrating high builder performance, the sulfonate group-containing copolymer is contained in an amount of preferably from 0.1% to 15% by mass, more preferably from 0.3% to 10% by mass, and still more preferably from 0.5% to 5% by mass based on the total amount of the detergent composition.

The detergent composition used for detergents usually contains a surfactant or an additive to be used in detergents. The specific forms of the surfactant and additive are not particularly limited, and are appropriately selected based on common knowledge in the field of detergents. The detergent composition may be in the form of a powder or liquid.

One or more surfactants selected from the group consisting of anionic surfactants, nonionic surfactants, cationic surfactants, and amphoteric surfactants are used. When two or more of them are used in combination, the total amount of an anionic surfactant and a nonionic surfactant is preferably not less than 50% by mass, more preferably not less than 60% by mass, further more preferably not less than 70% by mass, and particularly preferably not less than 80% by mass based on the amount of all the surfactants.

Suitable examples of anionic surfactants include alkylbenzene sulfonates, alkylether sulfates, alkenylether sulfates, alkyl sulfates, alkenyl sulfates, α-olefinsulfonates, α-sulfo fatty acid or α-sulfo fatty acid ester salts, alkane sulfonates, saturated fatty acid salts, unsaturated fatty acid salts, alkylether carboxylates, alkenylether carboxylates, amino acid-based surfactants, N-acylamino acid-based surfactants, alkyl phosphates or their salts, and alkenyl phosphates or their salts. An alkyl group and an alkenyl group in these anionic surfactants may have an alkyl side group such as a methyl side group.

Suitable examples of nonionic surfactants include polyoxyalkylene alkyl ether, polyoxyalkylene alkenyl ether, polyoxyethylene alkyl phenyl ether, higher-fatty-acid alkanol amide or their alkylene oxide adducts, sucrose fatty acid esters, alkyl glycoxydes, fatty acid glycerin monoesters, and alkylamine oxides. An alkyl group and an alkenyl group in these nonionic surfactants may have an alkyl side group such as a methyl side group.

Suitable examples of cationic surfactants include quaternary ammonium salts. Suitable examples of amphoteric surfactants include carboxyl-based amphoteric surfactants and sulfobetaine-based amphoteric surfactants. An alkyl group and an alkenyl group in these cationic surfactants and amphoteric surfactants may have an alkyl side group such as a methyl side group.

The surfactant is blended usually from 10% to 60% by mass, preferably 15% to 50% by mass, more preferably from 20% to 45% by mass, and particularly preferably from 25% to 40% by mass in the total amount of the detergent composition. An excessively small amount of the surfactant may prevent demonstration of sufficient washing performance. An excessively large amount of the surfactant may lead to disadvantages in terms of cost.

Suitable examples of additives include alkali builders, chelate builders, anti-redeposition agents for preventing redeposition of contaminants, such as sodium carboxymethylcellulose, soil inhibitors such as benzotriazole and ethylenethiourea, soil release agents, color migration inhibitors, softening agents, alkaline substances for pH adjustment, perfumes, solubilizing agents, fluorescent agents, coloring agents, foaming agents, foam stabilizers, lustering agents, bactericides, bleaching agents, bleaching assistants, enzymes, dyes, and solvents. Powder detergent compositions preferably contain zeolite.

The detergent composition may contain other detergent builders in addition to the polymer composition of the present invention. The other detergent builder is not particularly limited. Examples of the other detergent builder include alkali builders such as carbonates, hydrogencarbonates, and silicates; chelate builders such as tripolyphosphates, pyrophosphates, Glauber's salt, nitrilotriacetates, ethylenediaminetetraacetate, citrates, a copolymer salt of (meth)acrylic acid, acrylic acid-maleic acid copolymers, fumarates, and zeolite; and carboxyl derivatives of polysaccharides such as carboxymethyl cellulose. Examples of counter salts used with the builder include alkali metals such as sodium and potassium, ammonium, and amine.

The additive (s) and the other detergent builder are usually blended, in total, preferably from 0.1% to 50% by mass, more preferably from 0.2% to 40% by mass, still more preferably from 0.3% to 35% by mass, particularly preferably from 0.4% to 30% by mass, and most preferably from 0.5% to 20% by mass in 100% by mass of the detergent composition. If the total amount of the additive(s) and the other detergent builder is less than 0.1% by mass, detergent performance may not be sufficiently exhibited. If the total amount thereof is more than 50% by mass, economic efficiency may be reduced.

It is understood that the concept of the "detergent composition" includes detergents used only for specific usages such as synthetic detergents of household detergents, detergents for industrial use such as detergents used in the textile industry, hard surface detergents, and bleaching detergents in which the performance delivered by one component is enhanced.

When the detergent composition is in the form of a liquid, water is usually contained in an amount of preferably from 0.1% to 75% by mass, more preferably from 0.2% to 70% by mass, still more preferably from 0.5% to 65% by mass, further still more preferably from 0.7% to 60% by mass, particularly preferably from 1% to 55% by mass, and most preferably from 1.5% to 50% by mass based on the total amount of the liquid detergent composition.

When the detergent composition is in the form of a liquid, the kaolin turbidity of the detergent composition is preferably not more than 200 mg/L, more preferably not more than 150 mg/L, still more preferably not more than 120 mg/L, particularly preferably not more than 100 mg/L, and most preferably not more than 50 mg/L.

The amount of change (difference) between the kaolin turbidities when the polymer composition of the present invention is added to the liquid detergent composition as a detergent builder and when no polymer composition of the present invention is added to the liquid detergent composition as a detergent builder is preferably not more than 500 mg/L, more preferably not more than 400 mg/L, still more preferably not more than 300 mg/L, particularly preferably not more than 200 mg/L, and most preferably not more than 100 mg/L. The value of the kaolin turbidity is measured by the following method.

<Method of Measuring Kaolin Turbidity>

A uniformly stirred sample (liquid detergent) is charged in a 50-mm square cell having a thickness of 10 mm, and bubbles are removed therefrom. Then, the sample is measured for turbidity (kaolin turbidity: mg/L) at 25° C. using an NDH2000 (trade name, turbidity meter) produced by Nippon Denshoku Industries Co., Ltd.

Suitable examples of enzymes that can be blended with the detergent composition include proteases, lipases, and cellulases. Among these, proteases, alkali lipases, and alkali cellulases are preferable because these are highly active in alkali washing liquids.

The amount of the enzyme is preferably not more than 5% by mass in 100% by mass of the detergent composition. If the amount of the enzyme is more than 5% by mass, the washing performance no longer improves, and disadvantages in cost may be caused.

The detergent composition produces little salt precipitates and has a high washing effect even when used in an area where there is hard water with high concentrations of calcium ions and magnesium ions (for example, not less than 100 mg/L). The effect is particularly remarkable when the detergent composition contains an anion surfactant such as LAS.

Advantageous Effects of Invention

The sulfonate group-containing polymer of the present invention has the above features, and has anti-redeposition properties, particularly anti-redeposition properties against hydrophilic soil under high hardness condition. Accordingly, the polymer can be suitably used for materials of detergent additives or the like.

DESCRIPTION OF EMBODIMENTS

Hereinafter, the present invention will be described in more detail using examples, but the present invention will not be limited to only these examples. Unless otherwise specified, "parts" means "parts by weight," and "%" means "% by mass".

The weight average molecular weight Mw and number average molecular weight of the polymer of the present invention, and the solid content in the aqueous polymer solution were measured according to the following methods.

<Measurement Conditions (GPC) of Weight Average Molecular Weight Mw>

Instrument: HLC-8320GPC, produced by Tosoh Co., Ltd.
Detector: RI
Column: SHODEX Asahipak GF-310-HQ, GF-710-HQ, GF-IG 7B, produced by Showa Denko
Column temperature: 40° C.
Flow rate: 0.5 mL/min
Working curve: Polyacrylic acid standard, produced by Sowa Kagaku
Elution solution: 0.1 N sodium acetate/acetonitrile=3/1 (ratio by mass)

<Measurement Method of Solid Content of Aqueous Polymer Solution>

The polymer composition (1.0 g of polymer composition+ 1.0 g of water) was oven dried at 130° C. for 1 hour under a nitrogen atmosphere. The solid content (%) and the volatile component (%) were calculated from the weight difference before and after drying.

<Evaluation of Anti-Redeposition Properties>

In evaluation of anti-redeposition properties under high hardness condition in the present invention, clay mentioned in the item (4) was used instead of carbon black as soil.

(1) A cotton cloth obtained from Testfabrics, Inc. was cut into 5 cm×5 cm to prepare white clothes. Whiteness of each of the white clothes was previously measured as reflectance using colorimetry color difference meter SE6000 type produced by Nippon Denshoku Industries Co., Ltd.

(2) Pure water was added to calcium chloride dihydrate (5.0 g) to prepare hard water (17 kg).

(3) Pure water was added to polyoxyethylene (8) lauryl ether (4.0 g) to prepare an aqueous surfactant solution (100.0 g). The pH was controlled to 8.5 with sodium hydroxide.

(4) The temperature of a Terg-o-Tometer was set at 25° C. To a pot were added hard water (1 L), an aqueous surfactant solution (5 g), a 2% (solids content) aqueous polymer solution (1 g), and test powder 1 (class 11) (1 g) according to JIS Z 8901. The contents were stirred for 1 min at 100 rpm. Then, five white cloths were put into the solution, and the solution was stirred for 10 min at 100 rpm.

(5) The white cloths were wrung by hand. Hard water (1 L) at 25° C. was charged into the pot, and was stirred for 2 min at 100 rpm.

(6) Each of the white cloths was pressed with a filler cloth to be dried while smoothing wrinkles. The dried clothes were measured for whiteness again as reflectance with the above colorimetric difference meter.

(7) From the measurement results, the anti-redeposition performance was determined according to the following formula.

(8) Anti-redeposition performance (%)=(whiteness after washing)/(whiteness of original white cloth)×100

<Test for Compatibility with Liquid Detergents>

Detergents were prepared from the resulting novel copolymers according to the examples and the components listed below. Stirring was performed so that the components were uniformly dispersed. The turbidity at 25° C. was visually evaluated.

The results were evaluated by the following three grades.
Excellent: No separation, no precipitation and no white turbidity were visually observed
Good: White turbidity was slightly observed
Fair: White turbidity was observed
Detergent Compositions
SFT-70H (SOFTANOL 70H, produced by NIPPON SHOKUBAI, polyoxyethylene alkyl ether): 11 g
NEOPELEX F-65 (produced by Kao Corporation, sodium dodecylbenzenesulfonate): 32 g
Diethanolamine: 10 g
Ethanol: 5 g
Novel copolymers and comparative copolymers obtained in the examples: 1.0 g of solid
Pure water: balance
Total: 100 g Example 1

A 500 ml glass separable flask equipped with a reflux condenser and a stirrer was charged with pure water (49.7 g) and Mohr's salt (0.010 g), and the temperature was raised to 85° C. while stirring. Then, 80% acrylic acid (112.5 g) (hereinafter, abbreviated as 80% AA), a 40% aqueous solution (54.9 g) (92 mmol) of sodium 3-allyloxy-2-hydroxypropanesulfonate (hereinafter, abbreviated as 40% HAPS), a 80% aqueous solution (90.0 g) of an isoprenol-ethylene oxide 10 mol adduct (hereinafter, abbreviated as 80% IPN10), 15% sodium persulfate (30.2 g) (hereinafter, abbreviated as 15% NaPS), 35% sodium hydrogen sulfite (12.9 g) (hereinafter, abbreviated as 35% SBS), and pure water (50.9 g) were added dropwise from different nozzles. The addition times for the respective solutions were 180 min for 80% AA, 150 min for 40% HAPS, 90 min for 80% IPN10, 190 min for 15% NaPS, and 175 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled, and neutralized with 48% sodium hydroxide (89.1 g) (hereinafter, abbreviated as 48% NaOH). Thus, an aqueous copolymer solution (1) having a solid content concentration of 44% and a final degree of neutralization of 90 mol % was prepared (the copolymer was referred to as polymer (1)). The polymer (1) was subjected to the compatibility test, and the compatibility was evaluated as "Excellent".

Example 2

A 500 ml glass separable flask equipped with a reflux condenser and a stirrer was charged with pure water (74.1 g) and Mohr's salt (0.010 g), and the temperature was raised to 85° C. while stirring. Then, 80% AA (121.5 g), 40% HAPS (65.9 g) (111 mmol), a 60% aqueous solution (102.0 g) of an isoprenol-ethylene oxide 25 mol adduct (hereinafter, abbreviated as 60% IPN25), 15% NaPS (20.6 g), and 35% SBS (11.0 g) were added dropwise from different nozzles. The addition times for the respective solutions were 180 min for 80% AA, 150 min for 40% HAPS, 150 min for 60% IPN25, 190 min for 15% NaPS, and 175 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (95.7 g). Thus, an aqueous copolymer solution (2) having a solid content concentration of 44% and a final degree of neutralization of 90 mol % was prepared (the copolymer was referred to as polymer (2)). The polymer (2) was subjected to the compatibility test, and the compatibility was evaluated as "Good".

Example 3

A 500 ml glass separable flask equipped with a reflux condenser and a stirrer was charged with pure water (83.1 g) and Mohr's salt (0.013 g) and the temperature was raised to 85° C. while stirring. Then, 80% AA (198.0 g), 40% HAPS (25.9 g) (44 mmol), a 60% aqueous solution (31.1 g) of an isoprenol-ethylene oxide 50 mol adduct (hereinafter, abbreviated as 60% IPN50), 15% NaPS (30.1 g), and 35% SBS (10.3 g) were added dropwise from different nozzles. The addition times for the respective solutions were 180 min for 80% AA, 150 min for 40% HAPS, 150 min for 60% IPN50, 190 min for 15% NaPS, and 175 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with pure water (56.3 g) and 48% NaOH (162.6 g). Thus, an aqueous copolymer solution (3) having a solid content concentration of 40% and a final degree of neutralization of 90 mol % was prepared (the copolymer was referred to as polymer (3)).

Example 4

A 500 ml glass separable flask equipped with a reflux condenser and a stirrer was charged with pure water (118.0 g) and Mohr's salt (0.012 g), and the temperature was raised to 85° C. while stirring. Then, 80% AA (157.5 g), 40% HAPS (54.9 g) (92 mmol), a 60% aqueous solution (60.0 g) of an isoprenol-ethylene oxide 50 mol adduct (hereinafter, abbreviated as 60% IPN50), 15% NaPS (37.3 g), and 35% SBS (12.5 g) were added dropwise from different nozzles. The addition times for the respective solutions were 180 min for 80% AA, 150 min for 40% HAPS, 150 min for 60% IPN50, 190 min for 15% NaPS, and 175 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (126.6 g). Thus, an aqueous copolymer solution (4) having a solid content concentration of 40% and a final degree of neutralization of 90 mol % was prepared (the copolymer was referred to as polymer (4)).

Example 5

A 500 ml glass separable flask equipped with a reflux condenser and a stirrer was charged with pure water (75.0 g) and Mohr's salt (0.011 g), and the temperature was raised to 85° C. while stirring. Then, 80% AA (103.5 g), 40% HAPS (85.7 g) (144 mmol), 60% IPN50 (131.6 g), 15% NaPS (22.4 g), 35% SBS (9.2 g), and pure water (5.0 g) were added dropwise from different nozzles. The addition times for the respective solutions were 180 min for 80% AA, 60 min for 40% HAPS, 100 min for 60% IPN50, 210 min for 15% NaPS, and 200 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with pure water (59.4 g) and 48% NaOH (56.6 g). Thus, an aqueous copolymer solution (5) having a solid content concentration of 40% and a final degree of neutralization of 70 mol % was prepared (the copolymer was referred to as polymer (5)). The polymer (5) was subjected to the compatibility test, and the compatibility was evaluated as "Excellent".

Example 6

A 500 ml glass separable flask equipped with a reflux condenser and a stirrer was charged with pure water (116.5 g) and Mohr's salt (0.012 g), and the temperature was raised to 85° C. while stirring. Then, 80% AA (135.0 g), 40% HAPS (65.9 g) (111 mmol), 60% IPN50 (84.0 g), 15% NaPS (32.7 g), and 35% SBS (11.7 g) were added dropwise from different nozzles. The addition times for the respective solutions were 180 min for 80% AA, 150 min for 40% HAPS, 150 min for 60% IPN50, 190 min for 15% NaPS, and 175 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (107.0 g). Thus, an aqueous copolymer solution (6) having a solid content concentration of 40% and a final degree of neutralization of 90 mol % was prepared (the copolymer was referred to as polymer (6)).

Example 7

A 500 ml glass separable flask equipped with a reflux condenser and a stirrer was charged with pure water (88.9 g) and Mohr's salt (0.014 g), and the temperature was raised to 85° C. while stirring. Then, 80% AA (135.0 g), 40% HAPS (75.1 g) (126 mmol), 60% IPN50 (150.0 g), 15% NaPS (23.5 g), 35% SBS (15.3 g), and pure water (10.0 g) were added dropwise from different nozzles. The addition times for the respective solutions were 180 min for 80% AA, 60 min for 40% HAPS, 100 min for 60% IPN50, 210 min for 15% NaPS, and 200 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with pure water (62.4 g) and 48% NaOH (106.2 g). Thus, an aqueous copolymer solution (7) having a solid content concentration of 40% and a final degree of neutralization of 90 mol % was prepared (the copolymer was referred to as polymer (7)). The polymer (7) was subjected to the compatibility test, and the compatibility was evaluated as "Excellent".

Example 8

A 500 ml glass separable flask equipped with a reflux condenser and a stirrer was charged with pure water (75.0 g) and Mohr's salt (0.011 g), and the temperature was raised to 85° C. while stirring. Then, 80% AA (112.5 g), 40% HAPS (50.1 g) (84 mmol), 60% IPN50 (120.0 g), 15% NaPS (22.8 g), 35% SBS (7.7 g), and pure water (5.0 g) were added dropwise from different nozzles. The addition times for the respective solutions were 180 min for 80% AA, 60 min for 40% HAPS, 100 min for 60% IPN50, 210 min for 15% NaPS, and 200 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with pure water (56.5 g) and 48% NaOH (67.3 g). Thus, an aqueous copolymer solution (8) having a solid content concentration of 40% and a final degree of neutralization of 70 mol % was prepared (the copolymer was referred to as polymer (8)). The polymer (8) was subjected to the compatibility test, and the compatibility was evaluated as "Excellent".

Example 9

A 500 ml glass separable flask equipped with a reflux condenser and a stirrer was charged with pure water (45.0 g), 60% IPN50 (60.0 g), and Mohr's salt (0.014 g), and the temperature was raised to 85° C. while stirring. Then, 80% AA (72.0 g), 40% HAPS (96.1 g) (162 mmol), 60% IPN50 (266.4 g), 15% NaPS (70.8 g), 35% SBS (10.3 g), and pure water (10.0 g) were added dropwise from different nozzles. The addition times for the respective solutions were 180 min for 80% AA, 30 min for 40% HAPS, 90 min for 60% IPN50, 210 min for 15% NaPS, and 200 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (51.2 g). Thus, an aqueous copolymer solution (9) having a solid content concentration of 47% and a final degree of neutralization of 90 mol % was prepared (the copolymer was referred to as polymer (9)). The polymer (9) was subjected to the compatibility test, and the compatibility was evaluated as "Excellent".

Example 10

A 500 ml glass separable flask equipped with a reflux condenser and a stirrer was charged with pure water (69.0 g) and Mohr's salt (0.011 g), and the temperature was raised to 85° C. while stirring. Then, 80% AA (103.5 g), 40% HAPS (25.0 g) (42 mmol), 60% IPN50 (147.0 g), 15% NaPS (20.5 g), 35% SBS (7.0 g), and pure water (4.6 g) were added dropwise from different nozzles. The addition times for the respective solutions were 180 min for 80% AA, 90 min for 40% HAPS, 100 min for 60% IPN50, 210 min for 15% NaPS, and 200 min for 35% SBS and pure water. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with pure water (70.5 g) and 48% NaOH (64.3 g). Thus, an aqueous copolymer solution (10) having a solid content concentration of 40% and a final degree of neutralization of 70 mol % was prepared (the copolymer was referred to as polymer (10)). The polymer (10) was subjected to the compatibility test, and the compatibility was evaluated as "Excellent".

Example 11

A 500 ml glass separable flask equipped with a reflux condenser and a stirrer was charged with pure water (69.6 g) and Mohr's salt (0.010 g), and the temperature was raised to 85° C. while stirring. Then, 80% AA (90.0 g), 48% NaOH (4.2 g), a 40% aqueous solution (74.1 g) (136 mmol) of 2-acrylamide-2-methylpropanesulfonic acid (hereinafter, abbreviated as 40% AMPS), 60% IPN50 (114.4 g), 15% NaPS (31.9 g), and 35% SBS (15.7 g) were added dropwise from different nozzles. The addition times for the respective solutions were 180 min for 80% AA and 48% NaOH, 100 min for 40% AMPS and 60% IPN50, 200 min for 15% NaPS, and 210 min for 35% SBS. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (49.3 g) and pure water (42.8 g). Thus, an aqueous copolymer solution (11) having a solid content concentration of 40% and a final degree of neutralization of 90 mol % was prepared (the copolymer was referred to as polymer (11)). The polymer (11) was subjected to the compatibility test, and the compatibility was evaluated as "Good".

Example 12

An aqueous copolymer solution (12) (the copolymer was referred to as polymer (12)) was prepared by polymerizing the monomers and performing the post treatments as in Example 10 except that the proportions of the monomers were changed. The aqueous copolymer solution (12) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=2.2/7.7/90.1, a solid content concentration of 40%, and a final degree of neutralization of 90 mol %. The ratio by mass P of the structural unit (b) to the structural unit (a) of the copolymer was 3.7, the weight average molecular weight (Mw) of the copolymer was 42,000, the product (hereinafter, referred to as P×Mw) of the ratio by mass P of the structural unit (b) to the structural unit (a) multiplied by the weight average molecular weight Mw of the copolymer was 154,000, and the product (hereinafter, referred to as P×Mw×n) of the ratio by mass P of the structural unit (b) to the structural unit (a) multiplied by the weight average molecular weight Mw of the copolymer multiplied by the value n in the formula (2) was 7,700,000.

Example 13

An aqueous copolymer solution (13) (the copolymer was referred to as polymer (13)) was prepared by polymerizing the monomers and performing the post treatments as in Example 10 except that the proportions of the monomers were changed. The aqueous copolymer solution (13) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=20/29/51, a solid content concentration of 40%, and a final degree of neutralization of 90 mol %. The ratio by mass P of the structural unit (b) to the structural unit (a) of the copolymer was 1.5, the weight average molecular weight Mw of the copolymer was 23,000, (P×Mw) was 33,400, and (P×Mw×n) was 1,670,000.

Example 14

An aqueous copolymer solution (14) (the copolymer was referred to as polymer (14)) was prepared by polymerizing the monomers and performing the post treatments as in Example 1 except that the proportions of the monomers were changed. The aqueous copolymer solution (14) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/34/55, a solid content concentration of 40%, and a final degree of neutralization of 90 mol %. The ratio by mass P of the structural unit (b) to the structural unit (a) of the copolymer was 3.1, the weight average molecular weight Mw of the copolymer was 36,000, (P×Mw) was 111,000, and (P×Mw×n) was 1,110,000.

Example 15

An aqueous copolymer solution (15) (the copolymer was referred to as polymer (15)) was prepared by polymerizing the monomers and performing the post treatments as in Example 2 except that the proportions of the monomers were changed. The aqueous copolymer solution (15) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/34/55, a solid content concentration of 44%, and a final degree of neutralization of 90 mol %. The ratio by mass P of the structural unit (b) to the structural unit (a) of the copolymer was 3.1, the weight average molecular weight Mw of the copolymer was 44,000, (P×Mw) was 136,000, and (P×Mw×n) was 3,400,000.

Example 16

An aqueous copolymer solution (16) (the copolymer was referred to as polymer (16)) was prepared by polymerizing the monomers and performing the post treatments as in Example 10 except that the proportions of the monomers were changed. The aqueous copolymer solution (16) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=38/21/41, a solid content concentration of 39%, and a final degree of neutralization of 90 mol %. The ratio by mass P of the structural unit (b) to the structural unit (a) of the copolymer was 0.55, the weight average molecular weight Mw of the copolymer was 50,000, (P×Mw) was 27,600, and (P×Mw×n) was 1,380,000.

Example 17

An aqueous copolymer solution (17) (the copolymer was referred to as polymer (17)) was prepared by polymerizing the monomers and performing the post treatments as in Example 10 except that the proportions of the monomers were changed. The aqueous copolymer solution (17) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=26/20/54, a solid content concentration of 40%, and a final degree of neutralization of 90 mol %. The ratio by mass P of the structural unit (b) to the structural unit (a) of the copolymer was 0.77, the weight average molecular weight Mw of the copolymer was 29,000, (P×Mw) was 22,300, and (P×Mw×n) was 1,110,000.

Example 18

An aqueous copolymer solution (18) (the copolymer was referred to as polymer (18)) was prepared by polymerizing the monomers and performing the post treatments as in Example 10 except that the proportions of the monomers were changed. The aqueous copolymer solution (18) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/12/77, a solid content concentration of 40%, and a final degree of neutralization of 90 mol %. The ratio by mass P of the structural unit (b) to the structural unit (a) of the copolymer was 1.1, the weight average molecular weight Mw of the copolymer was 57,000, (P×Mw) was 62,200, and (P×Mw×n) was 3,110,000.

Example 19

An aqueous copolymer solution (19) (the copolymer was referred to as polymer (19)) was prepared by polymerizing the monomers and performing the post treatments as in Example 10 except that the proportions of the monomers were changed. The aqueous copolymer solution (19) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=27/35/38, a solid content concentration of 40%, and a final degree of neutralization of 90 mol %. The ratio by mass P of the structural unit (b) to the structural unit (a) of the copolymer was 1.3, the weight average molecular weight Mw of the copolymer was 15,000, (P×Mw) was 19,400, and (P×Mw×n) was 972,000. The polymer (19) was subjected to the compatibility test, and the compatibility was evaluated as "Excellent".

Example 20

An aqueous copolymer solution (20) (the copolymer was referred to as polymer (20)) was prepared by polymerizing the monomers and performing the post treatments as in Example 10 except that the proportions of the monomers were changed. The aqueous copolymer solution (20) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=16/34/50, a solid content concentration of 40%, and a final degree of neutralization of 90 mol %. The ratio by mass P of the structural unit (b) to the structural unit (a) of the copolymer was 2.1, the weight average molecular weight Mw of the copolymer was 12,000, (P×Mw) was 25,500, and (P×Mw×n) was 1,280,000. The polymer (20) was subjected to the compatibility test, and the compatibility was evaluated as "Excellent".

Example 21

An aqueous copolymer solution (21) (the copolymer was referred to as polymer (21)) was prepared by polymerizing the monomers and performing the post treatments as in Example 10 except that the proportions of the monomers were changed. The aqueous copolymer solution (21) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=18/40/42, a solid content concentration of 40%, and a final degree of neutralization of 90 mol %. The ratio by mass P of the structural unit (b) to the structural unit (a) of the copolymer was 2.2, the weight average molecular weight Mw of the copolymer was 31,000, (P×Mw) was 68,900, and (P×Mw×n) was 3,440,000.

Example 22

An aqueous copolymer solution (22) (the copolymer was referred to as polymer (22)) was prepared by polymerizing the monomers and performing the post treatments as in Example 10 except that the proportions of the monomers were changed. The aqueous copolymer solution (22) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/34/55, a solid content concentration of 40%, and a final degree of neutralization of 90 mol %. The ratio by mass P of the structural unit (b) to the structural unit (a) of the copolymer was 3.1, the weight average molecular weight Mw of the copolymer was 28,000, (P×Mw) was 86,500, and (P×Mw×n) was 4,330,000. The polymer (22) was subjected to the compatibility test, and the compatibility was evaluated as "Good".

Example 23

An aqueous copolymer solution (23) (the copolymer was referred to as polymer (23)) was prepared by polymerizing the monomers and performing the post treatments as in Example 10 except that the proportions of the monomers were changed. The aqueous copolymer solution (23) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/34/55, a solid content concentration of 40%, and a final degree of neutralization of 90 mol %. The ratio by mass P of the structural unit (b) to the structural unit (a) of the copolymer was 3.1, the weight average molecular weight Mw of the copolymer was 57,000, (P×Mw) was 176,000, and (P×Mw×n) was 8,810,000.

Example 24

An aqueous copolymer solution (24) (the copolymer was referred to as polymer (24)) was prepared by polymerizing the monomers and performing the post treatments as in Example 10 except that the proportions of the monomers were changed. The aqueous copolymer solution (24) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=12/40/48, a solid content concentration of 40%, and a final degree of neutralization of 90 mol %. The ratio by mass P of the structural unit (b) to the structural unit (a) of the copolymer was 3.3, the weight average molecular weight Mw of the copolymer was 25,000, (P×Mw) was 83,300, and (P×Mw×n) was 4,170,000. The polymer (24) was subjected to the compatibility test, and the compatibility was evaluated as "Excellent".

Example 25

An aqueous copolymer solution (25) (the copolymer was referred to as polymer (25)) was prepared by polymerizing the monomers and performing the post treatments as in Example 10 except that the proportions of the monomers were changed. The aqueous copolymer solution (25) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=13/52/35, a solid content concentration of 40%, and a final degree of neutralization of 70 mol %. The ratio by mass P of the structural unit (b) to the structural unit (a) of the copolymer was 4.0, the weight average molecular weight Mw of the copolymer was 36,000, (P×Mw) was 144,000, and (P×Mw×n) was 7,200,000.

Example 26

An aqueous copolymer solution (26) (the copolymer was referred to as polymer (26)) was prepared by polymerizing the monomers and performing the post treatments as in Example 10 except that the proportions of the monomers were changed. The aqueous copolymer solution (26) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/50/39, a solid content concentration of 40%, and a final degree of neutralization of 70 mol %. The ratio by mass P of the structural unit (b) to the structural unit (a) of the copolymer was 4.5, the weight average molecular weight Mw of the copolymer was 65,000, (P×Mw) was 295,000, and (P×Mw×n) was 14,800,000.

Comparative Example 1

A 500 ml glass separable flask equipped with a reflux condenser and a stirrer was charged with pure water (46.2 g) and Mohr's salt (0.011 g), and the temperature was raised to 85° C. while stirring. Then, 80% AA (135.0 g), 40% HAPS (135.0 g) (227 mmol), IPN10 (54.0 g), 15% NaPS (36.6 g), and 35% SBS (26.1 g) were added dropwise from different nozzles. The addition times for the respective solutions were 180 min for 80% AA, 90 min for 40% HAPS, 120 min for IPN10, 190 min for 15% NaPS, and 175 min for 35% SBS. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (106.3 g). Thus, a comparative aqueous copolymer solution (1) having a solid content concentration of 48% by weight and a final degree of neutralization of 94 mol % was prepared (the copolymer was referred to as comparative polymer (1)). The comparative polymer (1) was subjected to the compatibility test, and the compatibility was evaluated as "Fair".

Comparative Example 2

A 500 ml glass separable flask equipped with a reflux condenser and a stirrer was charged with pure water (80.0 g) and Mohr's salt (0.013 g), and the temperature was raised to 85° C. while stirring. Then, 80% AA (126.0 g), 40% HAPS (224.2 g) (377 mmol), an isoprenol-ethylene oxide 5 mol adduct (hereinafter, abbreviated as IPN5) (20.2 g), 15% NaPS (61.4 g), 35% SBS (8.4 g), and pure water (10.0 g) were added dropwise from different nozzles. The addition times for the respective solutions were 180 min for 80% AA, 40 min for 40% HAPS, 90 min for IPN5, 190 min for 15% NaPS, and 120 min for 35% SBS and pure water. The solutions other than 35% SBS and pure water began to be added dropwise at the same time. Addition dropwise of the 35% SBS and the pure water was started 60 min after the addition dropwise of the 80% AA was started. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (84.4 g). Thus, a comparative aqueous copolymer solution (2) having a solid content concentration of 40% by weight and a final degree of neutralization of 90 mol % was prepared (the comparative copolymer was referred to as comparative polymer (2)). The comparative polymer (2) was subjected to the compatibility test, and the compatibility was evaluated as "Fair".

Comparative Example 3

A 500 ml glass separable flask equipped with a reflux condenser and a stirrer was charged with pure water (12.9 g) and Mohr's salt (0.012 g), and the temperature was raised to 85° C. while stirring. Then, 80% AA (180.0 g), 40% HAPS (138.5 g) (233 mmol), 60% IPN50 (36.9 g), 15% NaPS (30.2 g), and 35% SBS (32.2 g) were added dropwise from different nozzles. The addition times for the respective solutions were 180 min for 80% AA, 150 min for 40% HAPS, 150 min for 60% IPN50, 190 min for 15% NaPS, and 175 min for 35% SBS. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (141.7 g) Thus, a comparative aqueous copolymer solution (3) having a solid content concentration of 48% by weight and a final degree of neutralization of 92 mol % was prepared (the comparative copolymer was referred to as comparative polymer (3)). The comparative polymer (3) was subjected to the compatibility test, and the compatibility was evaluated as "Fair".

Comparative Example 4

A 500 ml glass separable flask equipped with a reflux condenser and a stirrer was charged with pure water (80.3 g) and Mohr's salt (0.011 g), and the temperature was raised to 85° C. while stirring. Then, 80% AA (63.0 g), 40% HAPS (175.8 g) (295 mmol), 60% IPN50 (120.0 g), 15% NaPS (34.2 g), and 35% SBS (14.7 g) were added dropwise from different nozzles. The addition times for the respective solutions were 180 min for 80% AA, 150 min for 40% HAPS, 150 min for 60% IPN50, 190 min for 15% NaPS, and 175 min for 35% SBS. All the solutions began to be added dropwise at the same time. The temperature of the content was kept at 85° C. until the addition dropwise of 80% AA was finished. Further, the temperature was kept the same for 30 min after the addition dropwise of 80% AA was completed so that the reaction solution was aged, and the polymerization was completed. After completing the polymerization, the reaction solution was cooled and neutralized with 48% NaOH (37.7 g). Thus, a comparative aqueous copolymer solution (4) having a solid content concentration of 40% by weight and a final degree of neutralization of 90 mol % was prepared (the comparative copolymer was referred to as comparative polymer (4)). The comparative polymer (4) was subjected to the compatibility test, and the compatibility was evaluated as "Excellent".

Comparative Example 5

A comparative aqueous copolymer solution (5) (the comparative copolymer was referred to as comparative polymer (5)) was prepared by polymerizing the monomers and performing the post treatments as in Comparative Example 2 except that the proportions of the monomers were changed. The comparative aqueous copolymer solution (5) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=32/19/48, a solid content concentration of 40%, and a final degree of neutralization of 90 mol %. The ratio by mass P of the structural unit (b) to the structural unit (a) of the copolymer was 0.59, the weight average molecular weight Mw of the copolymer was 7,000, (P×Mw) was 4,160, and (P×Mw×n) was 20,800.

Comparative Example 6

A comparative aqueous copolymer solution (6) (the comparative copolymer was referred to as comparative polymer (6)) was prepared by polymerizing the monomers and performing the post treatments as in Comparative Example 2 except that the proportions of the monomers were changed. The comparative aqueous copolymer solution (6) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=10/20/70, a solid content concentration of 40%, and a final degree of neutralization of 90 mol %. The ratio by mass P of the structural unit (b) to the structural unit (a) of the copolymer was 2.0, the weight average molecular weight Mw of the copolymer was 12,000, (P×Mw) was 24,000, and (P×Mw×n) was 120,000. The comparative polymer (6) was subjected to the compatibility test, and the compatibility was evaluated as "Fair".

Comparative Example 7

A 500 ml glass separable flask equipped with a reflux condenser and a stirrer was charged with pure water (85.3 g)

and Mohr's salt (0.011 g), and the temperature was raised to 85° C. while stirring. Then, 80% AA (141.8 g), 40% HAPS (60.4 g) (1.02 mmol), 80% IPN10 (58.5 g), 15% NaPS (35.8 g), and 35% SBS (10.7 g) were added dropwise from different nozzles. The addition times for the respective solutions were 180 min for the 80% AA, 150 min for the 40% HAPS, 150 min for the 80% IPN10, 190 min for the 15% NaPS, and 175 min for the 35% SBS. All the solutions began to be added dropwise at the same time. The temperature of the content was kept at 85° C. until the addition dropwise of 80% AA was finished. Further, the temperature was kept the same for 30 min after addition dropwise of 80% AA was completed so that the reaction solution was aged, and the polymerization was completed. After completing the polymerization, the reaction solution was cooled and neutralized with 48% NaOH (113.0 g). Thus, an comparative aqueous copolymer solution (7) having a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=11/26/63, a solid content concentration of 44% and a final degree of neutralization of 90 mol % was prepared (the comparative copolymer was referred to as comparative polymer (7)). The comparative polymer (7) was subjected to the compatibility test, and the compatibility was evaluated as "Good".

Comparative Example 8

A comparative aqueous copolymer solution (8) (the comparative copolymer was referred to as comparative polymer (8)) was prepared by polymerizing the monomers and performing the post treatments as in Comparative Example 7 except that the proportions of the monomers were changed. The comparative aqueous copolymer solution (8) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=32/19/49, a solid content concentration of 43%, and a final degree of neutralization of 90 mol %. The ratio by mass P of the structural unit (b) to the structural unit (a) of the copolymer was 0.59, the weight average molecular weight Mw was 18,000, (P×Mw) was 10,700, and (P×Mw×n) was 107,000.

Comparative Example 9

A comparative aqueous copolymer solution (9) (the comparative copolymer was referred to as comparative polymer (9)) was prepared by polymerizing the monomers and performing the post treatments as in Comparative Example 7 except that the proportions of the monomers were changed. The comparative aqueous copolymer solution (9) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=21/20/59, a solid content concentration of 44%, and a final degree of neutralization of 90 mol %. The ratio by mass P of the structural unit (b) to the structural unit (a) of the copolymer was 1.0, the weight average molecular weight Mw was 33,000, (P×Mw) was 31,400, and (P×Mw×n) was 314,000.

Comparative Example 10

A comparative aqueous copolymer solution (10) (the comparative copolymer was referred to as comparative polymer (10)) was prepared by polymerizing the monomers and performing the post treatments as in Comparative Example 7 except that the proportions of the monomers were changed. The comparative aqueous copolymer solution (10) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=34/34/32, a solid content concentration of 44%, and a final degree of neutralization of 90 mol %. The ratio by mass P of the structural unit (b) to the structural unit (a) of the copolymer was 1.0, the weight average molecular weight Mw was 33,000, (P×Mw) was 33,000, and (P×Mw×n) was 330,000.

Comparative Example 11

A comparative aqueous copolymer solution (11) (the comparative copolymer was referred to as comparative polymer (11)) was prepared by polymerizing the monomers and performing the post treatments as in Comparative Example 7 except that the proportions of the monomers were changed. The comparative aqueous copolymer solution (11) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=19/20/61, a solid content concentration of 44%, and a final degree of neutralization of 90 mol %. The ratio by mass P of the structural unit (b) to the structural unit (a) of the copolymer was 1.1, the weight average molecular weight Mw of the copolymer was 24,000, (P×Mw) was 25,300, and (P×Mw×n) was 253,000.

Comparative Example 12

A comparative aqueous copolymer solution (12) (the comparative copolymer was referred to as comparative polymer (12)) was prepared by polymerizing the monomers and performing the post treatments as in Comparative Example 7 except that the proportions of the monomers were changed. The comparative aqueous copolymer solution (12) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=17/24/59, a solid content concentration of 43%, and a final degree of neutralization of 90 mol %. The ratio by mass P of the structural unit (b) to the structural unit (a) of the copolymer was 1.4, the weight average molecular weight Mw of the copolymer was 13,000, (P×Mw) was 18,400, and (P×Mw×n) was 184,000.

Comparative Example 13

A comparative aqueous copolymer solution (13) (the comparative copolymer was referred to as comparative polymer (13)) was prepared by polymerizing the monomers and performing the post treatments as in Comparative Example 7 except that the proportions of the monomers were changed. The comparative aqueous copolymer solution (13) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=10/40/50, a solid content concentration of 44%, and a final degree of neutralization of 90 mol %. The ratio by mass P of the structural unit (b) to the structural unit (a) of the copolymer was 4.0, the weight average molecular weight Mw of the copolymer was 15,000, (P×Mw) was 60,000, and (P×Mw×n) was 600,000.

Comparative Example 14

A comparative aqueous copolymer solution (14) (the comparative copolymer was referred to as comparative polymer (14)) was prepared by polymerizing the monomers and performing the post treatments as in Example 2 except that the proportions of the monomers were changed. The comparative aqueous copolymer solution (14) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=32/19/49, a solid content concentration of 40%, and a final degree of neutralization of 90 mol %. The ratio by mass P of the structural unit (b) to the structural unit (a) of the copolymer was 0.59, the weight average molecular weight Mw of the copolymer was 11,000, (P×Mw) was 6,530, and (P×Mw×n) was 163,000.

Comparative Example 15

A comparative aqueous copolymer solution (15) (the comparative copolymer was referred to as comparative polymer (15)) was prepared by polymerizing the monomers and performing the post treatments as in Example 2 except that the proportions of the monomers were changed. The comparative aqueous copolymer solution (15) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=26/26/48, a solid content concentration of 40%, and a final degree of neutralization of 90 mol %. The ratio by mass P of the structural unit (b) to the structural unit (a) of the copolymer was 1.0, the weight average molecular weight Mw of the copolymer was 9,000, (P×Mw) was 9,000, and (P×Mw×n) was 225,000.

Comparative Example 16

A comparative aqueous copolymer solution (16) (the comparative copolymer was referred to as comparative polymer (16)) was prepared by polymerizing the monomers and performing the post treatments as in Example 2 except that the proportions of the monomers were changed. The comparative aqueous copolymer solution (16) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=32/32/36, a solid content concentration of 40%, and a final degree of neutralization of 90 mol %. The ratio by mass P of the structural unit (b) to the structural unit (a) of the copolymer was 1.0, the weight average molecular weight Mw of the copolymer was 22,000, (P×Mw) was 22,000, and (P×Mw×n) was 550,000.

Comparative Example 17

A comparative aqueous copolymer solution (17) (the comparative copolymer was referred to as comparative polymer (17)) was prepared by polymerizing the monomers and performing the post treatments as in Example 2 except that the proportions of the monomers were changed. The comparative aqueous copolymer solution (17) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=18/20/62, a solid content concentration of 44%, and a final degree of neutralization of 90 mol %. The ratio by mass P of the structural unit (b) to the structural unit (a) of the copolymer was 1.1, the weight average molecular weight Mw of the copolymer was 23,000, (P×Mw) was 25,600, and (P×Mw×n) was 639,000.

Comparative Example 18

A comparative aqueous copolymer solution (18) (the comparative copolymer was referred to as comparative polymer (17)) was prepared by polymerizing the monomers and performing the post treatments as in Example 2 except that the proportions of the monomers were changed. The comparative aqueous copolymer solution (18) had a ratio by mass of a structural unit (a) derived from a sulfonate group-containing monomer (A) to a structural unit (b) derived from a (poly)oxyalkylene monomer (B) to a structural unit (c) derived from a carboxyl group-containing monomer (C) of (a)/(b)/(c)=10/20/70, a solid content concentration of 40%, and a final degree of neutralization of 90 mol %. The ratio by mass P of the structural unit (b) to the structural unit (a) of the copolymer was 2.0, the weight average molecular weight Mw of the copolymer was 9,000, (P×Mw) was 18,000, and (P×Mw×n) was 450,000.

Table 1 shows monomer components, the proportions of the structural units (a), (b), and (c), the proportion of the structural unit (b) to the structural unit (a), the weight average molecular weight (Mw), the product of the ratio by mass P of the structural unit (b) to the structural unit (a) multiplied by the weight average molecular weight Mw, the product of the ratio by mass P of the structural unit (b) to the structural unit (a) multiplied by the weight average molecular weight Mw of the sulfonate group-containing copolymer multiplied by the value n in the formula (2), the results of evaluations of anti-redeposition properties of the polymers obtained in Examples and Comparative Examples and the results of test for compatibility with liquid detergents.

TABLE 1

| | Monomer component | | | Proportion of each structural unit (% by mass) | | |
|---|---|---|---|---|---|---|
| | Sulfonate group-containing monomer (A) | (Poly)oxyalkylene monomer (B) | Carboxyl group-containing monomer (C) | Structural unit (a) | Structural unit (b) | Structural unit (c) |
| Example 1 | HAPS | IPN10 | AA | 10 | 40 | 50 |
| Example 2 | HAPS | IPN25 | AA | 12 | 34 | 54 |

TABLE 1-continued

| | | | | | | |
|---|---|---|---|---|---|---|
| Example 3 | HAPS | IPN50 | AA | 5 | 10 | 85 |
| Example 4 | HAPS | IPN50 | AA | 10 | 20 | 70 |
| Example 5 | HAPS | IPN50 | AA | 15 | 42 | 44 |
| Example 6 | HAPS | IPN50 | AA | 12 | 28 | 60 |
| Example 7 | HAPS | IPN50 | AA | 11 | 40 | 49 |
| Example 8 | HAPS | IPN50 | AA | 9 | 40 | 51 |
| Example 9 | HAPS | IPN50 | AA | 13 | 64 | 23 |
| Example 10 | HAPS | IPN50 | AA | 5 | 49 | 46 |
| Example 11 | AMPS | IPN50 | AA | 16 | 41 | 43 |
| Example 12 | HAPS | IPN50 | AA | 2 | 8 | 90 |
| Example 13 | HAPS | IPN50 | AA | 20 | 29 | 51 |
| Example 16 | HAPS | IPN50 | AA | 38 | 21 | 41 |
| Example 18 | HAPS | IPN50 | AA | 11 | 12 | 77 |
| Example 19 | HAPS | IPN50 | AA | 27 | 35 | 38 |
| Example 20 | HAPS | IPN50 | AA | 16 | 34 | 50 |
| Example 22 | HAPS | IPN50 | AA | 11 | 34 | 55 |
| Example 23 | HAPS | IPN50 | AA | 11 | 34 | 55 |
| Example 24 | HAPS | IPN50 | AA | 12 | 40 | 48 |
| Example 26 | HAPS | IPN50 | AA | 11 | 50 | 39 |
| Comparative Example 1 | HAPS | IPN10 | AA | 22 | 26 | 52 |
| Comparative Example 2 | HAPS | IPN5 | AA | 38 | 10 | 52 |
| Comparative Example 3 | HAPS | IPN50 | AA | 22 | 10 | 68 |
| Comparative Example 4 | HAPS | IPN50 | AA | 32 | 40 | 28 |

| | Structural unit (b)/ Structural unit (a) (P) | Weight average molecular weight (Mw) | (P) × (Mw) | (P) × (Mw) × (n) | Anti-redeposition properties (%) | Compatibility |
|---|---|---|---|---|---|---|
| Example 1 | 4.0 | 27,000 | 108,000 | 1,080,000 | 65.8 | Excellent |
| Example 2 | 2.8 | 32,000 | 90,700 | 2,270,000 | 66.8 | Good |
| Example 3 | 2.0 | 47,000 | 94,000 | 4,700,000 | 66.3 | Fair |
| Example 4 | 2.0 | 27,000 | 54,000 | 2,700,000 | 66.3 | Fair |
| Example 5 | 2.8 | 70,000 | 196,000 | 9,800,000 | 67.3 | Excellent |
| Example 6 | 2.3 | 23,000 | 53,700 | 2,680,000 | 68.1 | Fair |
| Example 7 | 3.6 | 42,000 | 153,000 | 7,640,000 | 67.0 | Excellent |
| Example 8 | 4.4 | 72,000 | 320,000 | 16,000,000 | 66.9 | Excellent |
| Example 9 | 4.9 | 44,000 | 217,000 | 10,800,000 | 65.5 | Excellent |
| Example 10 | 9.8 | 68,000 | 666,000 | 33,300,000 | 67.7 | Excellent |
| Example 11 | 2.6 | 70,000 | 179,000 | 8,970,000 | 64.9 | Good |
| Example 12 | 3.7 | 42,000 | 154,000 | 7,700,000 | 65.6 | — |
| Example 13 | 1.5 | 23,000 | 33,400 | 1,670,000 | 65.1 | — |
| Example 16 | 0.55 | 50,000 | 27,600 | 1,380,000 | 65.9 | — |
| Example 18 | 1.1 | 57,000 | 62,200 | 3,110,000 | 66.6 | — |
| Example 19 | 1.3 | 15,000 | 19,400 | 972,000 | 64.8 | Excellent |
| Example 20 | 2.1 | 12,000 | 25,500 | 1,280,000 | 65.4 | Excellent |
| Example 22 | 3.1 | 28,000 | 86,500 | 4,330,000 | 67.9 | Good |
| Example 23 | 3.1 | 57,000 | 176,000 | 8,810,000 | 67.4 | — |
| Example 24 | 3.3 | 25,000 | 83,300 | 4,170,000 | 66.7 | Excellent |
| Example 26 | 4.5 | 65,000 | 295,000 | 14,800,000 | 66.3 | — |
| Comparative Example 1 | 1.2 | 20,000 | 23,600 | 236,000 | 63.7 | Poor |
| Comparative Example 2 | 0.26 | 67,000 | 17,600 | 88,200 | 62.0 | Poor |
| Comparative Example 3 | 0.45 | 15,000 | 6,820 | 341,000 | 63.9 | Poor |
| Comparative Example 4 | 1.3 | 15,000 | 18,800 | 938,000 | 62.9 | Excellent |

The evaluation of anti-redeposition properties in the present invention is performed with detergent compositions that are intended for liquid detergents without zeolite. Zeolite is a water softener which catches metal ions such as calcium ions and magnesium ions contained in water to reduce hardness of water. Therefore, the tests are performed under a higher hardness condition than when a zeolite-containing detergent is used. Further, the tests are performed using dirt (test powder 1 (class 11 clay) according to JIS Z 8901) as typical hydrophilic particle soil. As a result, the evaluation of anti-redeposition properties shows that the polymer of the present invention has excellent anti-redeposition properties against hydrophilic particles under high hardness condition.

The invention claimed is:
1. A sulfonate group-containing copolymer, comprising:
   a structural unit (a) derived from a sulfonate group-containing monomer (A);
   a structural unit (b) derived from a (poly)oxyalkylene monomer (B) represented by the following formula (1):

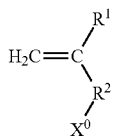

(1)

wherein R¹ represents a hydrogen atom or a methyl group; R² represents a direct bond, CH$_2$, or CH$_2$CH$_2$; and X⁰ represents a structural unit represented by the following formula (2):

(2)

wherein Z may be the same or different and each represents a structural unit derived from a C$_2$-C$_5$ alkylene oxide; R⁰ represents hydrogen atom or a methyl group; and n is an integer of from 5 to 100; and a structural unit (c) derived from a carboxyl group-containing monomer (C) that is at least one selected from the group consisting of (meth)acrylic acid, maleic acid, maleic anhydride, and salts thereof, wherein the sulfonate group-containing copolymer comprises from 2% to 38% by mass of the structural unit (a), from 9% to 70% by mass of the structural unit (b), and from 20% to 90% by mass in an acid form equivalent of the structural unit (c) in 100% by mass of all the structural units constituting the sulfonate group-containing copolymer, wherein the product (P×Mw×n) of the ratio by mass P of the structural unit (b) to the structural unit (a) multiplied by the weight average molecular weight Mw of the sulfonate group-containing copolymer multiplied by the value n in the formula (2) is from 950,000 to 33,300,000, wherein the sulfonate group-containing monomer (A) is at least one of 2-acrylamide-2-methylpropanesulfonic acid and a compound represented by the following formula (3):

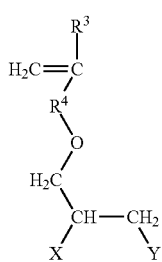

(3)

wherein R³ represents a hydrogen atom or a methyl group; R⁴ represents a direct bond, CH$_2$, or CH$_2$CH$_2$; X and Y each represent a hydroxy group or SO$_3$M where M represents a hydrogen atom, Li, Na, or K, and at least one of X and Y is SO$_3$M, wherein the sulfonate group-containing copolymer optionally comprises a structural unit (e) derived from a monomer (E) that is none of the monomer (A), the monomer (B), and the monomer (C) in an amount no more than 20% by mass based on 100% by mass of the structural units (a), (b), (c), and (e), and wherein the degree of neutralization of the sulfonate group-containing copolymer is 1 to 100 mol %, wherein an anti-redeposition property exhibited by the sulfonate group-containing copolymer, evaluated as follows, is 64.8% to 68.1%:

<Evaluation of Anti-Redeposition Properties>

In evaluation of anti-redeposition properties under high hardness condition, clay is used in item (4) as soil (1) A cotton cloth obtained from Testfabrics, Inc. is cut into 5 cm×5 cm to prepare white clothes and whiteness of each of the white clothes is previously measured as reflectance using colorimetry color difference meter SE6000 type produced by Nippon Denshoku Industries Co., Ltd.

(2) Pure water is added to calcium chloride dihydrate (5.0 g) to prepare hard water (17 kg)

(3) Pure water is added to polyoxyethylene (8) lauryl ether (4.0 g) to prepare an aqueous surfactant solution (100.0 g) and pH is controlled to 8.5 with sodium hydroxide (4) The temperature of a Terg-o-Tometer was set at 25° C., to a pot are added hard water (1 L), an aqueous surfactant solution (5 g), a 2% (solids content) aqueous polymer solution (1 g), and test powder 1 (class 11) (1 g) according to JIS Z 8901, the contents are stirred for 1 min at 100 rpm, five white cloths are put into the solution, and the solution is stirred for 10 min at 100 rpm (5) The white cloths are wrung by hand, and hard water (1 L) at 25° C. is charged into the pot, and is stirred for 2 min at 100 rpm (6) Each of the white cloths is pressed with a filler cloth to be dried while smoothing wrinkles, and the dried cloths are measured for whiteness again as reflectance with the above colorimetric difference meter (7) From the measurement results, the anti-redeposition performance is determined according to the following formula Anti-redeposition performance(%)=(whiteness after washing)/(whiteness of original white cloth)×100.

2. The sulfonate group-containing copolymer according to claim 1, wherein the sulfonate group-containing copolymer has a weight average molecular weight Mw of from 20,000 to 200,000.

3. The sulfonate group-containing copolymer according to claim 1, wherein the sulfonate group-containing copolymer has a ratio by mass P of the structural unit (b) to the structural unit (a) of from 1.2 to 20.

4. The sulfonate group-containing copolymer according to claim 1, wherein the degree of neutralization of the sulfonate group-containing copolymer is 70 to 99 mol %.

5. The sulfonate group-containing copolymer according to claim 1, wherein the amount of the optional structural unit (e) is no more than 10% by mass.

6. A method of producing the sulfonate group-containing copolymer of claim 1, the method comprising:

copolymerizing monomer components including a sulfonate group-containing monomer (A), a (poly)oxyalkylene monomer (B), and a carboxyl group-containing monomer (C) that is at least one selected from the group consisting of (meth)acrylic acid, maleic acid, maleic anhydride, and salts thereof, the monomer (B) being represented by the following formula (1):

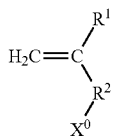  (1)

wherein $R^1$ represents a hydrogen atom or a methyl group; $R^2$ represents a direct bond, $CH_2$, or $CH_2CH_2$; and $X^0$ represents a structural unit represented by the following formula (2):

—Zn—OR⁰  (2)

wherein Z may be the same or different and each represents a structural unit derived from a $C_2$-$C_5$ alkylene oxide; $R^0$ represents a hydrogen atom or a methyl group; and n is an integer of from 5 to 100, wherein the monomer components comprise from 20% to 90% by mass in acid form equivalent of the carboxyl group-containing monomer (C) in 100% by mass of all the monomers in the monomer components, wherein the product (P×Mw×n) of the ratio by mass P of the structural unit (b) to the structural unit (a) multiplied by the weight average molecular weight Mw of the sulfonate group-containing copolymer multiplied by the value n in the formula (2) is from 950,000 to 33,300,000, wherein the sulfonate group-containing monomer (A) is at least one of 2-acrylamide-2-methylpropanesulfonic acid and a compound represented by the following formula (3):

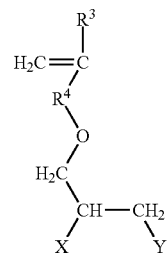  (3)

wherein $R^3$ represents a hydrogen atom or a methyl group; $R^4$ represents a direct bond, $CH_2$, or $CH_2CH_2$; X and Y each represent a hydroxy group or $SO_3M$ where M represents a hydrogen atom, Li, Na, or K, and at least one of X and Y is $SO_3M$, and wherein the degree of neutralization of the sulfonate group-containing copolymer is 1 to 100 mol %.

* * * * *